United States Patent
Kim et al.

(10) Patent No.: US 11,257,116 B2
(45) Date of Patent: Feb. 22, 2022

(54) METHOD AND APPARATUS FOR PROVIDING ADVERTISEMENT CONTENT AND RECORDING MEDIUM

(71) Applicant: SAMSUNG ELECTRONICS CO., LTD., Suwon-si (KR)

(72) Inventors: Sung-hyun Kim, Yongin-si (KR); Yong-deok Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 860 days.

(21) Appl. No.: 15/150,619

(22) Filed: May 10, 2016

(65) Prior Publication Data

US 2016/0364756 A1    Dec. 15, 2016

Related U.S. Application Data

(60) Provisional application No. 62/173,591, filed on Jun. 10, 2015.

(30) Foreign Application Priority Data

Sep. 9, 2015   (KR) .................. 10-2015-0127712

(51) Int. Cl.
  *G06Q 30/02* (2012.01)
  *H04W 4/21* (2018.01)
  (Continued)

(52) U.S. Cl.
  CPC ..... *G06Q 30/0255* (2013.01); *G06Q 30/0276* (2013.01); *H04L 43/16* (2013.01); *H04W 4/185* (2013.01); *H04W 4/21* (2018.02)

(58) Field of Classification Search
  CPC .................. G06Q 30/0207–30/0277
  (Continued)

(56) References Cited

U.S. PATENT DOCUMENTS

| | | |
|---|---|---|
| 7,440,674 B2 | 10/2008 | Plotnick et al. |
| 8,238,718 B2 | 8/2012 | Toyama et al. |

(Continued)

FOREIGN PATENT DOCUMENTS

| | | |
|---|---|---|
| KR | 2009-0044221 | 5/2009 |
| KR | 10-2011-0023615 | 3/2011 |
| KR | 2014-0015698 | 2/2014 |

OTHER PUBLICATIONS

Search Report dated Apr. 5, 2018 in counterpart European Patent Application No. 16807700.6.
Lim, et al: "Real-time adaptive advertisingl framework based on MPEG-21 for multi-screen IPTV environment", Consumer Electronics (ICCE), 2012 IEEE, Jan. 13, 2012, pp. 451-452.
(Continued)

*Primary Examiner* — Waseem Ashraf
*Assistant Examiner* — Richard G Reinhardt
(74) *Attorney, Agent, or Firm* — Nixon & Vanderhye P.C.

(57) ABSTRACT

A method of providing advertisement content is provided. The method includes selecting at least some parts from among a plurality of parts of an advertisement target which are generated by segmenting an image of the advertisement target based on time, determining association data associated with the advertisement target, based on one or more of characteristics of the selected parts and context information indicating a condition where the advertisement content is displayed, and combining the selected parts and the determined association data to create the advertisement content.

16 Claims, 24 Drawing Sheets

(51) Int. Cl.
*H04W 4/18* (2009.01)
*H04L 12/26* (2006.01)
(58) Field of Classification Search
USPC .................................................... 705/14, 319
See application file for complete search history.

(56) References Cited

U.S. PATENT DOCUMENTS

| | | | | |
|---|---|---|---|---|
| 2007/0100688 | A1* | 5/2007 | Book | G06Q 30/0254 |
| | | | | 705/14.52 |
| 2009/0228802 | A1* | 9/2009 | Shan | G06Q 30/02 |
| | | | | 715/733 |
| 2010/0017290 | A1 | 1/2010 | Matsui | |
| 2014/0324638 | A1 | 10/2014 | Khalid | |
| 2015/0286873 | A1* | 10/2015 | Davis | G06F 1/1694 |
| | | | | 382/103 |
| 2016/0092935 | A1* | 3/2016 | Bradley | G06Q 30/0276 |
| | | | | 705/14.72 |

OTHER PUBLICATIONS

Search Report and Written Opinion dated Aug. 16, 2016 in counterpart International Patent Application No. PCT/KR2016/004826.
European Office Action dated Feb. 22, 2019 for EP Application No. 16807700.6.
European Summons to Oral Proceedings dated Oct. 8, 2019 for EP Application No. 16807700.6.
Korean Office Action dated Mar. 30, 2020 for KR Application No. 10-2015-0127712.

* cited by examiner

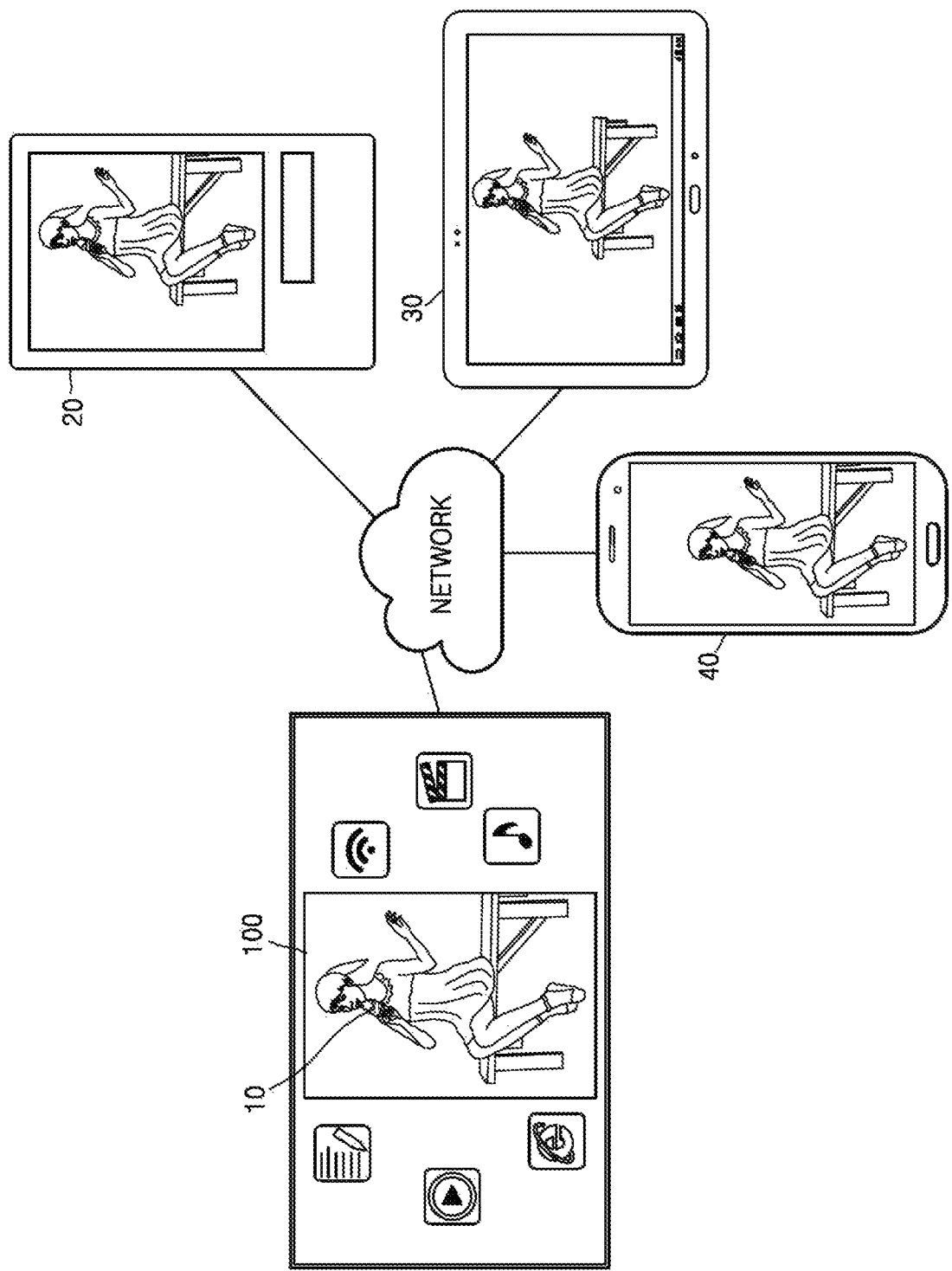

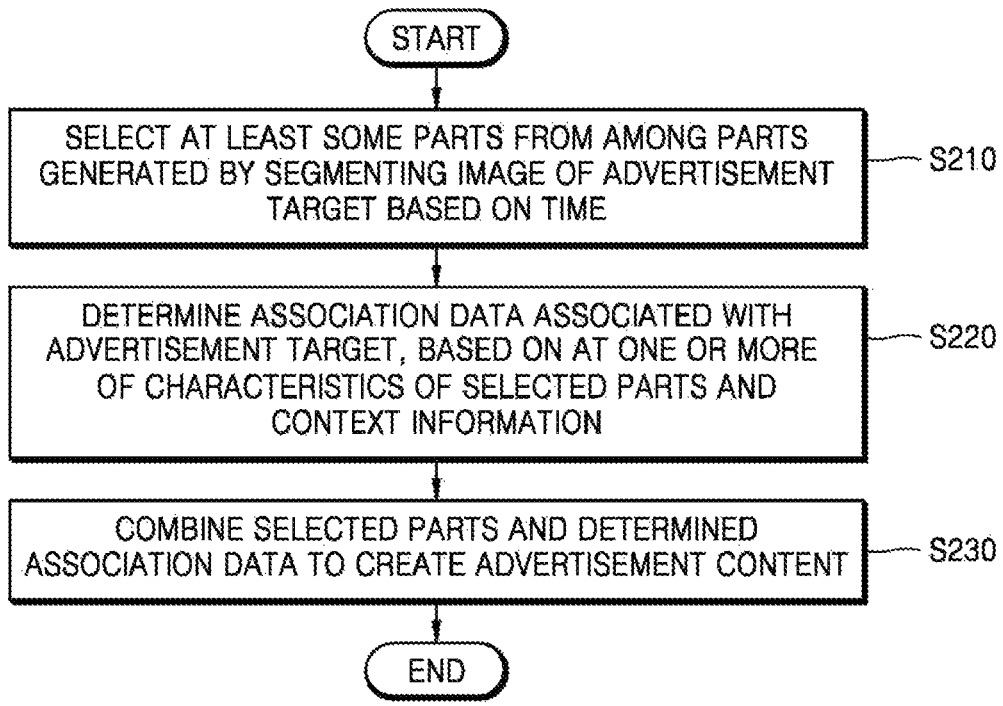
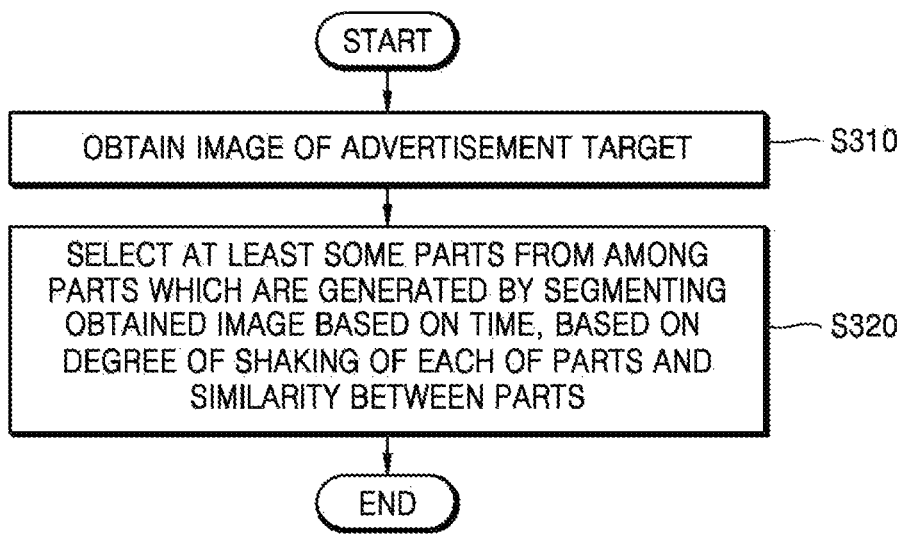

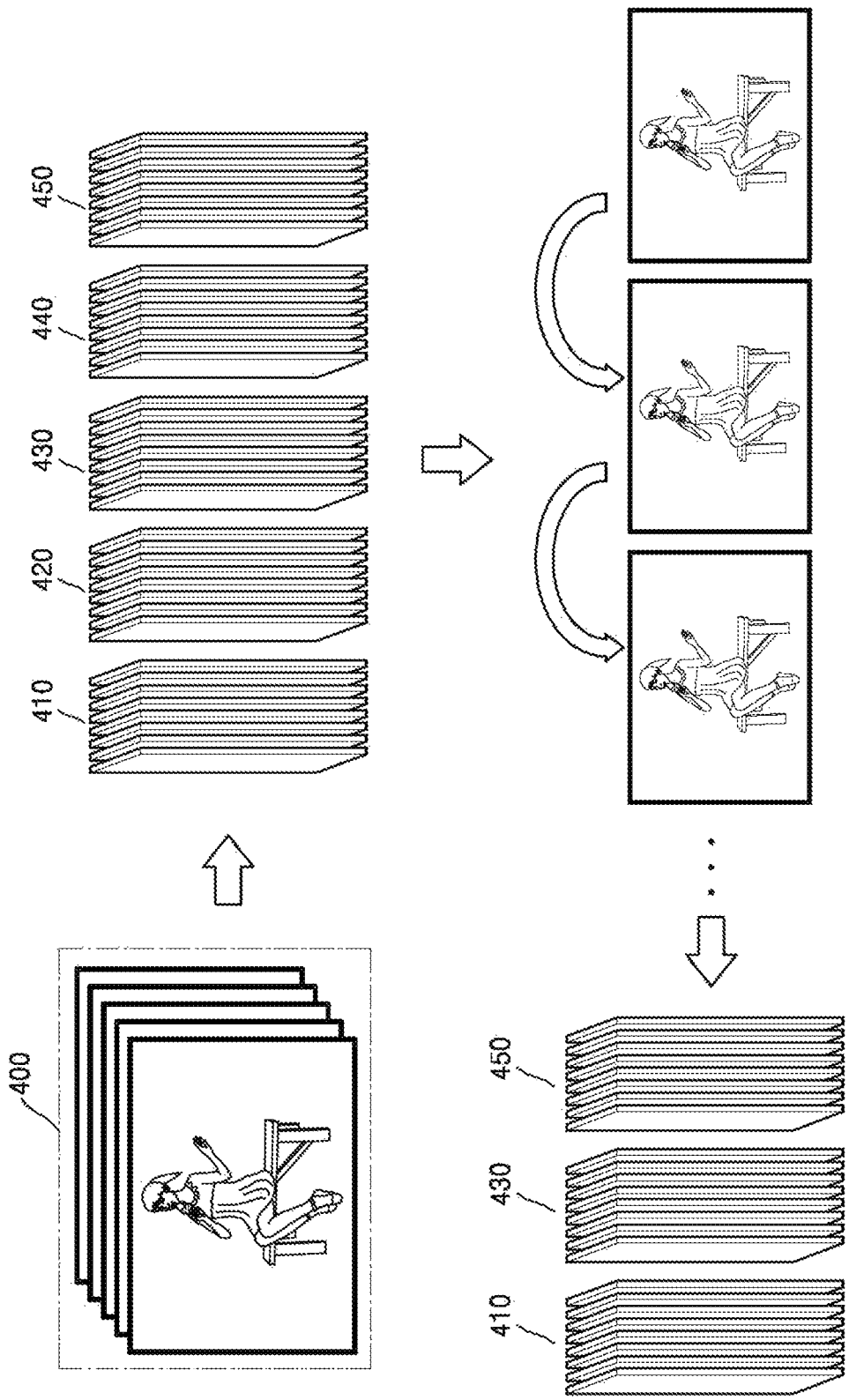

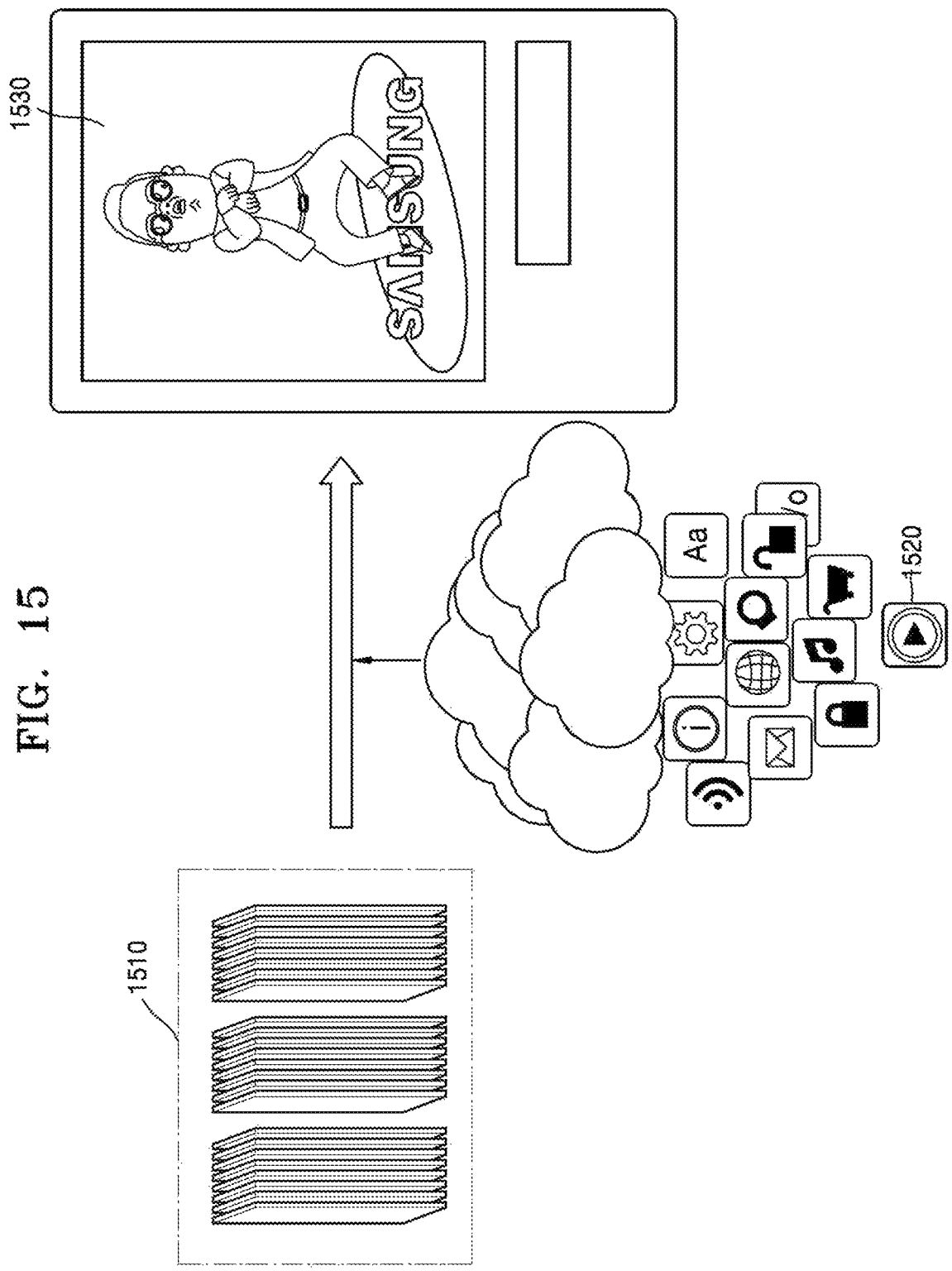

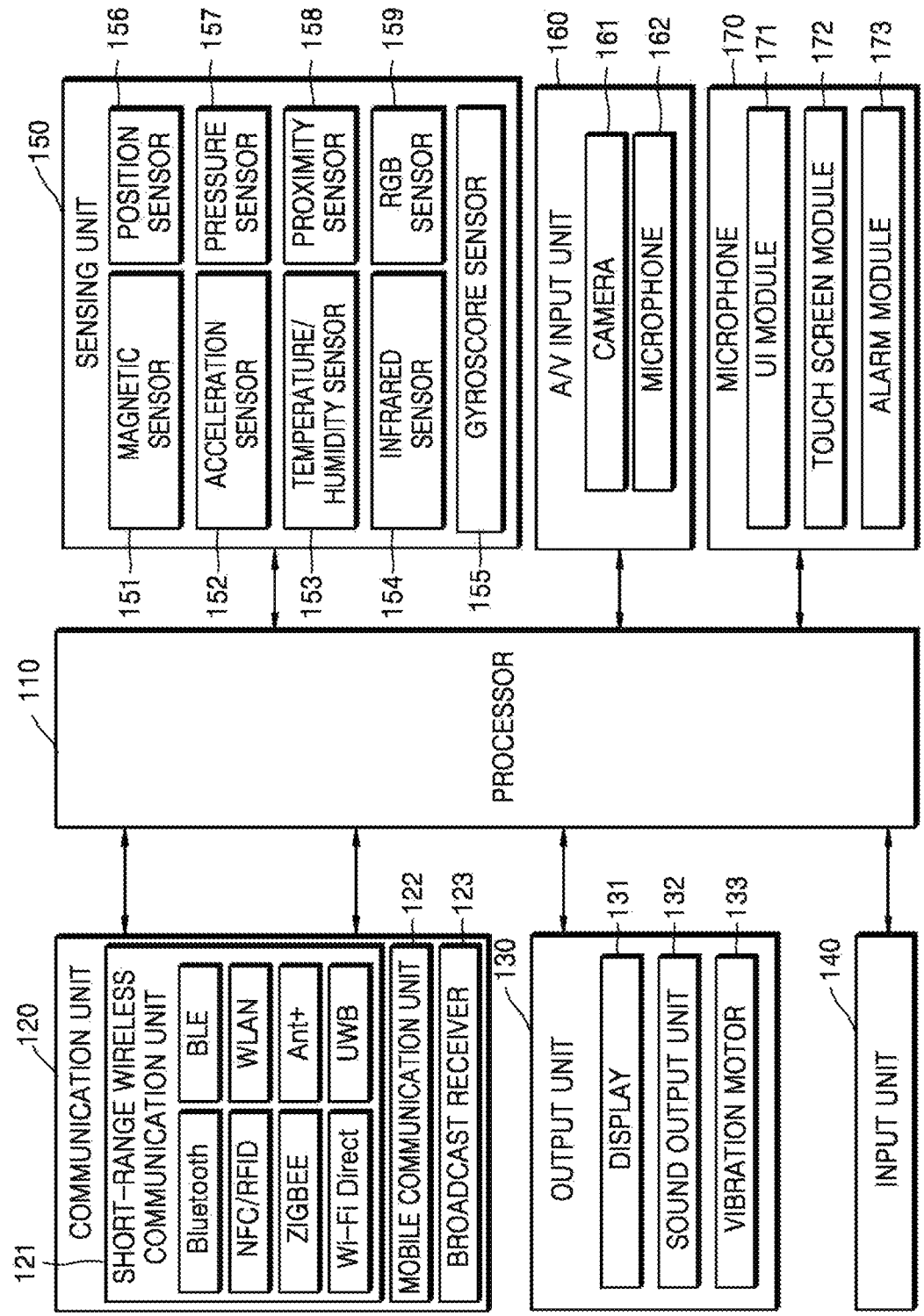

METHOD AND APPARATUS FOR PROVIDING ADVERTISEMENT CONTENT AND RECORDING MEDIUM

CROSS-REFERENCE TO RELATED APPLICATIONS

This application is based on and claims priority under 35 U.S.C. §119 to U.S. Provisional Application No. 62/173,591, filed on Jun. 10, 2015, in the US Patent Office and Korean Patent Application No. 10-2015-0127712, filed on Sep. 9, 2015, in the Korean Intellectual Property Office, the disclosures of which are incorporated by reference herein in their entireties.

BACKGROUND

1. Field

The present disclosure relates to an advertisement content providing method and apparatus and a recording medium storing a program for executing the advertisement content providing method.

2. Description of Related Art

Communication networks such as the Internet and the like advance rapidly, and information is generally provided over the communication networks. That is, an Internet user easily obtains necessary information over the Internet anywhere at any time, and search of information largely changes our lives. With the advancement of communication and computers, the Internet is transnationally used as a popular communication means, and the number of users of the Internet is progressively increasing. Correspondingly, services for Internet users are progressively increasing.

Particularly, an advertisement service among services provided over the Internet is a means for providing information about products, opportunities, and services. Various methods of providing an advertisement service are being developed.

Recently, a digital signage is attracting much attention as an advertising medium. The digital signage is a digital media where a digital display remotely controlled over a network is installed at public places or commercial spaces such as stores and/or the like, and provides information, entertainment, advertisement, and/or the like.

Particularly, various pieces of advertisement creation software for creating and distributing advertisements are provided for purchasers of the digital signage, or the service market for professionally creating advertisements is being vitalized.

SUMMARY

Additional aspects will be set forth in part in the description which follows and, in part, will be apparent from the description.

According to an aspect of an example embodiment, a method of providing advertisement content includes: selecting at least some parts from among a plurality of parts of an advertisement target which are generated by segmenting an image of an advertisement target based on time; determining association data associated with the advertisement target, based on one or more of characteristics of the selected parts and context information indicating a condition where the advertisement content is displayed; and combining the selected parts and the determined association data to create the advertisement content.

The selecting may include selecting at least some parts from among the plurality of parts of the advertisement target, based on one or more of a degree of shaking of each of the plurality of parts and a similarity between the plurality of parts.

The method may further include obtaining input data including at least one of image data, text data, and sound data, wherein the selecting may include selecting a part, including an item indicated by the obtained input data, from among the plurality of parts.

The context information may include one or more of a time when the advertisement content is displayed, a position at which the advertisement content is displayed, and profile information about a viewer viewing the advertisement content.

The method may further include determining one or more of a reproducible duration of the advertisement content and an item preferred by the viewer viewing the advertisement content, based on the context information, wherein the selecting may include selecting at least some parts from among the plurality of parts, based on the determination.

The determining of the association data may include determining, as association data, data including a preferred item, based on the profile information about the viewer viewing the advertisement content.

The method may further include: obtaining information about at least one piece of content for which a viewing frequency is greater than a predetermined threshold, wherein the selecting may include determining, as the association data, one of the at least one piece of content for which the viewing frequency is greater than a predetermined threshold.

The creating of the advertisement content may include: determining a position of the advertisement target in the selected parts; and displaying the determined association data within a range from the determined position.

The creating of the advertisement content may include: determining an arrangement order of the selected parts and the association data; and combining the selected parts and the association data, based on the determined arrangement order.

The method may further include: obtaining an image of a viewer viewing the advertisement content; and changing at least one image, included in the advertisement content, to the obtained image of the viewer to edit the advertisement content.

The method may further include: receiving content, stored in a device of a viewer viewing the advertisement content, from the device of the viewer; and changing at least some data, included in the created advertisement content, to at least some data of the received content to edit the created advertisement content.

The method may further include: obtaining an image captured from a position at which the advertisement content is displayed; and changing at least one image, included in the advertisement content, to the obtained image to edit the advertisement content.

The method may further include: while the advertisement content is being displayed, determining content for which a viewing frequency is greater than a predetermined threshold; and changing at least some data, included in the advertisement content, to at least some data included in the determined content to edit the advertisement content.

According to an aspect of another example embodiment, an apparatus for providing advertisement content includes: a processor configured to select at least some parts from among a plurality of parts of an advertisement target which are generated by segmenting an image of an advertisement target based on time, to determine association data associated with the advertisement target, based on one or more of characteristics of the selected parts and context information indicating a condition where the advertisement content is displayed, and to combine the selected parts and the determined association data to create the advertisement content; and communication circuitry configured to transmit the advertisement content to a display device.

The processor may be configured to select at least some parts from among the plurality of parts, based on one or more of a degree of shaking of each of the plurality of parts and a similarity between the plurality of parts.

The processor may be configured to select a part of the advertisement target, including an item indicated by input data including one or more of image data, text data, and sound data, from among the selected parts.

The context information may include one or more of a time when the advertisement content is displayed, a position at which the advertisement content is displayed, and profile information about a viewer viewing the advertisement content.

The processor may be configured to determine at least one of a reproducible duration of the advertisement content and an item preferred by the viewer viewing the advertisement content, based on the context information and may be further configured to select at least some parts from among the plurality of parts of the advertisement target, based on a result of the determination.

The processor may be configured to determine, as association data, data including an item preferred by the viewer, based on the profile information about the viewer viewing the advertisement content.

The communication circuitry may be configured to obtain information about at least one piece of content for which a viewing frequency is greater than a predetermined threshold, and may further be configured to determine, as the association data, one of the at least one piece of content for which the viewing frequency is greater than a predetermined threshold.

The processor may be configured to determine a position of the advertisement target in the selected parts and to display the determined association data within a range from the determined position.

The processor may be configured to determine an arrangement order of the selected parts and the association data and to combine the selected parts and the association data, based on the determined arrangement order.

The communication circuitry may be configured to obtain an image of a viewer viewing the advertisement content, and the processor may be configured to change at least one image, included in the advertisement content, to the obtained image of the viewer to edit the advertisement content.

The communication circuitry may be configured to receive content, stored in a device of a viewer viewing the advertisement content, from the device of the viewer, and the processor may be configured to change at least some data, included in the created advertisement content, to at least some data of the received content to edit the created advertisement content.

The communication circuitry may be configured to obtain an image captured from a position at which the advertisement content is displayed, and the processor may be configured to change at least one image, included in the advertisement content, to the obtained image to edit the advertisement content.

While the advertisement content is being displayed, the processor may be configured to determine content for which a viewing frequency is greater than a predetermined threshold, and may be further configured to change at least some data, included in the advertisement content, to at least some data included in the determined content to edit the advertisement content.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIG. 1 is a diagram illustrating an example advertisement content providing method;

FIG. 2 is a flowchart illustrating an example method of creating, by an advertisement content providing apparatus, advertisement content;

FIG. 3 is a flowchart illustrating an example method of selecting, by an advertisement content providing apparatus, some parts from among a plurality of parts based on characteristics of the plurality of parts;

FIG. 4 is a diagram illustrating an example method of selecting, by an advertisement content providing apparatus, some parts from among a plurality of parts based on characteristics of the plurality of parts;

FIG. 15 is a diagram illustrating an example method of determining, by an advertisement content providing apparatus, high-interest data as association data associated with an advertisement target on the Web to provide advertisement content;

FIGS. 24 and 25 are block diagrams illustrating example configurations of an advertisement content providing apparatus.

DETAILED DESCRIPTION

Figure 5:
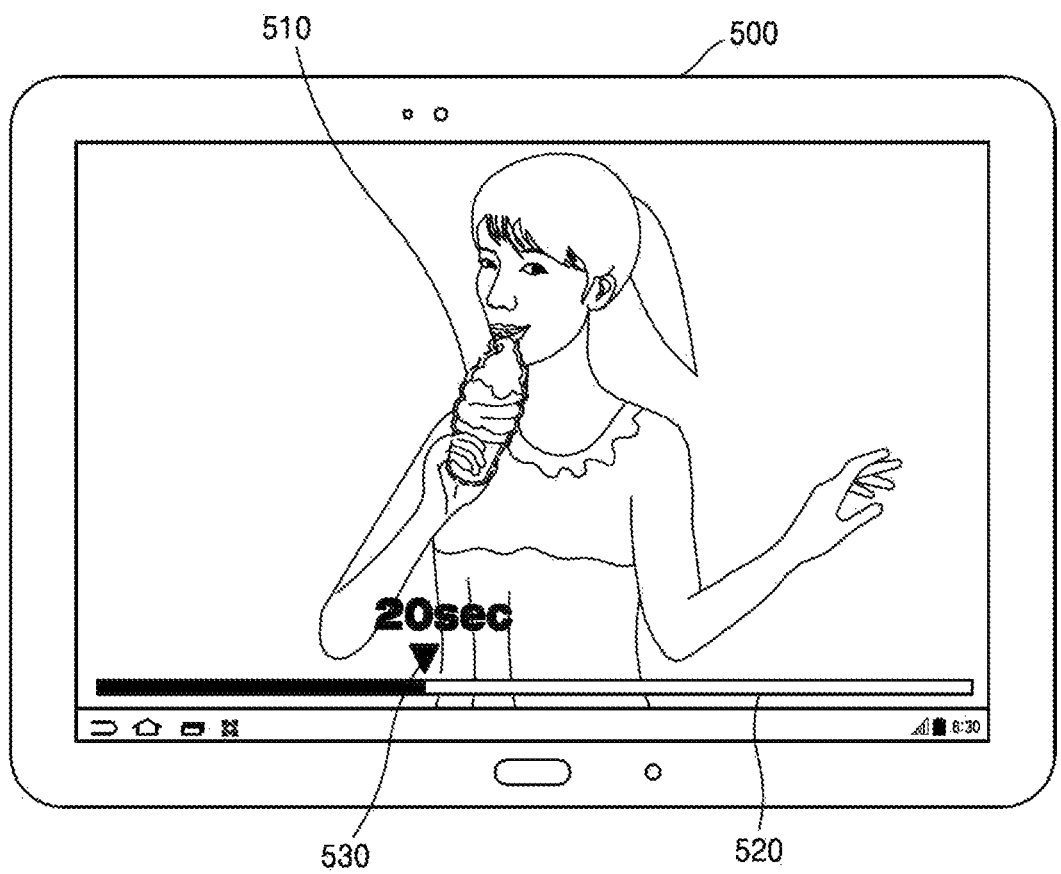
FIG. 5 is a diagram illustrating an example method of providing, by an advertisement content providing apparatus, information necessary for creating advertisement content corresponding to an image obtained by photographing an advertisement target.

Reference will now be made in greater detail to various embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of" when preceding a list of elements, modify the entire list of elements and do not modify the individual elements of the list.

Example embodiments capable of being easily embodied by those of ordinary skill in the art will now be described in greater detail with reference to the accompanying drawings. The disclosure may, however, be embodied in many different forms and should not be construed as being limited to the example embodiments set forth herein. In the accompanying drawings, a portion irrelevant to a description may be omitted for clarity. Moreover, like reference numerals refer to like elements throughout.

In the disclosure below, when one part (or element, device, etc.) is referred to as being 'connected' to another part (or element, device, etc.), it should be understood that the former may be 'directly connected' to the latter, or 'electrically connected' to the latter via an intervening part (or element, device, etc.). Furthermore, when it is described that one comprises (or includes or has) some elements, it should be understood that it may comprise (or include or has) only those elements, or it may comprise (or include or have) other elements as well as those elements if there is no specific limitation.

In the present description, advertisement content may, for example, be content which is created for providing information about an advertisement target such as a product, a service, an opportunity, and/or the like. The advertisement content may be provided in the form of moving images obtained by combining text data, image data, and sound data. However, this is merely an embodiment, and advertisement content is not limited thereto. The advertisement content according to an example embodiment may be created by combining an image including an advertisement target and association data associated with the advertisement target.

In the present description, an item may be an object indicated by data such as image data, text data, and sound data which are used to generate advertisement content or are included in the advertisement content. For example, an item indicated by ice cream image data, text data "ice cream", and sound data including voice "ice cream" may be an ice cream.

Moreover, context information may include information associated with a condition where advertisement content is displayed. For example, the context information may include profile information which includes a position and a time where the advertisement content is displayed, the kinds and number of devices displaying the advertisement content, and the age, sex, and job of a viewer viewing the advertisement content. Also, according to another example embodiment, the context information may include information about the kinds, number, and characteristics of display devices displaying the advertisement content. However, this is merely an example of the context information, and the context information is not limited to the above-describe example. According to another example embodiment, the context information may include information about other high-interest content corresponding to a time where the advertisement content is displayed.

Hereinafter, example embodiments will be described in greater detail with reference to the accompanying drawings.

FIG. 1 is a conceptual diagram illustrating an example advertisement content providing method.

Referring to FIG. 1, an advertisement content providing apparatus 100 may obtain an image of an advertisement target 10. The advertisement content providing apparatus 100 according to an example embodiment may photograph the advertisement target 10. For example, a user may photograph an ice cream, which is to be advertised, using the advertisement content providing apparatus 100. However, this is merely an embodiment, and the advertisement content providing apparatus 100 may obtain an image, obtained by photographing the advertisement target 10, from another device.

The advertisement content providing apparatus 100 according to an example embodiment may obtain association data associated with an advertisement target so as to effectively describe the advertisement target 10. For example, the advertisement content providing apparatus 100 may obtain at least one of text data, image data, and sound data which may be input by a user for providing advertisement content. As another example, the advertisement content providing apparatus 100 may obtain association data associated with the advertisement target 10 from another device. Also, according to another example embodiment, the advertisement content providing apparatus 100 may obtain high-interest content as association data on the Web. For example, a degree of interest may be determined based on the number of times viewers view content or a real-time searching word list provided from a website, but this is merely an example. A method of determining a degree of interest is not limited thereto.

The advertisement content providing apparatus 100 may segment an image of the advertisement target 10 based on time to generate a plurality of parts. For example, each of the plurality of parts may include at least one frame.

The advertisement content providing apparatus 100 may select at least some parts from among the plurality of parts included in the image of the advertisement target 10 to create advertisement content having a certain time duration. For example, the advertisement content providing apparatus 100 may select at least some parts from among the plurality of parts, based on a degree of shaking of each of the plurality of parts and a similarity between the plurality of parts. For example, the degree of shaking may denote a degree of shaking of a camera at a time when a corresponding part is photographed. The similarity may denote a degree of similarity between items respectively included in the plurality of parts.

According to another example embodiment, the advertisement content providing apparatus 100 may select some parts from among the plurality of parts, based on received input data, such as, for example, input from a user. According to another example embodiment, the advertisement content providing apparatus 100 may primarily select some parts from among the plurality of parts, based on the characteristics and similarity of the plurality of parts and may secondarily select at least some parts from among the selected some parts, based on data input from the user.

The advertisement content providing apparatus 100 may combine the selected parts and the association data to generate advertisement content. For example, the advertisement content providing apparatus 100 may determine one or more of arrangement order information, indicating an order where the selected parts and the association data are displayed, and arrangement information about a position at which the association data is marked on the selected parts.

The advertisement content providing apparatus 100 may provide the generated advertisement content to one or more display devices 20, 30 and 40. Examples of the display devices 20, 30 and 40 may include, for example, a digital signage device 20, a tablet personal computer (PC) 30, and a smartphone 40, but this is merely an embodiment. The present embodiment is not limited thereto.

FIG. 2 is a flowchart illustrating an example method of creating, by an advertisement content providing apparatus 100, advertisement content.

In operation S210, the advertisement content providing apparatus 100 may select at least some parts from among a plurality of parts which are generated by segmenting an image of an advertisement target based on time.

The advertisement content providing apparatus 100 may obtain an image of an advertisement target. For example, the advertisement content providing apparatus 100 may photograph a product A using a camera included therein so as to create advertisement content for the product A. According to another example embodiment, the advertisement content providing apparatus 100 may obtain an image of the photographed product A from an external image photographing device.

Moreover, the advertisement content providing apparatus 100 may segment the obtained image into a plurality of parts, based on time. For example, the plurality of parts may each include at least one frame.

The advertisement content providing apparatus 100 may select at least some parts from among the plurality of parts, based on characteristic of each of the plurality of parts. For example, the advertisement content providing apparatus 100 may select the at least some parts, based on at least one of a degree of shaking of each of the plurality of parts and a similarity between the plurality of parts. For example, the degree of shaking may be directly determined by measuring a movement of a camera which has photographed the advertisement target, and the movement of the camera may be indirectly determined based on image processing technology that finds a feature point of a captured image and traces a trajectory of the feature point. A method of measuring a movement of a camera may use all conventional methods. Also, the similarity may be determined based on a degree to which data included in a current part corresponds to data included in a previous or next part.

According to another example embodiment, the advertisement content providing apparatus 100 may select at least some parts from among a plurality of parts, based on received input data, such as, for example, user input data. For example, the input data may be data which is selected by a user for creating advertisement content, and may include at least one of text data and sound data. For example, the advertisement content providing apparatus 100 may select a part, including an item indicated by image data or text data, from the obtained image. Also, as another example, the advertisement content providing apparatus 100 may select at least some parts from among a plurality of parts, based on the changes in tempo and rhythm of sound data.

As another example, the advertisement content providing apparatus 100 may select at least some parts from among a plurality of parts, based on context information indicating a condition where advertisement content is displayed. For example, the advertisement content providing apparatus 100 may determine a length of advertisement content, based on a position and a time where the advertisement content is displayed, and may select at least some parts from among a plurality of parts, based on the determined length. As another example, the advertisement content providing apparatus 100 may determine an item which is high in interest of a viewer, based on the age, sex, and job of a viewer viewing advertisement content, and may select at least some parts from among a plurality of parts, based on the determined item.

In operation S220, the advertisement content providing apparatus 100 may determine association data associated with an advertisement target, based on one or more of characteristics of the selected parts and context information indicating a condition where the advertisement content is displayed.

The advertisement content providing apparatus 100 may determine the association data, based on an item included in the selected parts. For example, the advertisement content providing apparatus 100 may determine image data which is arranged along with the selected parts, based on a color of an image included in the selected parts. Also, the advertisement content providing apparatus 100 may determine sound data which is to be output along with the selected parts, based on a total length of the selected parts and the item included in the selected parts. As another example, the advertisement content providing apparatus 100 may determine text data for providing information about the selected parts.

According to another example embodiment, the advertisement content providing apparatus 100 may determine association data, based on a condition where advertisement content is displayed. For example, the advertisement content providing apparatus 100 may determine data, which is high in interest of viewers on the Web, as the association data. As another example, the advertisement content providing apparatus 100 may determine association data, based on the age, sex, and job of each of viewers which are expected to view advertisement content.

In operation S230, the advertisement content providing apparatus 100 may combine the selected parts and the determined association data to create advertisement content.

The advertisement content providing apparatus 100 may determine an arrangement order of the selected parts and the determined association data. For example, the advertisement content providing apparatus 100 may determine an output order of parts selected from a captured image of a product A and a brand name of the product A.

According to another example embodiment, the advertisement content providing apparatus 100 may determine a position at which the determined association data is arranged in the selected parts. For example, the advertisement content providing apparatus 100 may determine a position at which a text indicating that the product A is on sale is arranged in the selected parts. As another example, the advertisement content providing apparatus 100 may determine a position, which a commercial song for the product A is output, in a section where the parts selected from the captured image of the product A are reproduced.

According to another example embodiment, the advertisement content providing apparatus 100 may change the color, brightness, and contrast of each of the selected parts and the determined association data. For example, the advertisement content providing apparatus 100 may identically change brightness of the selected parts and determined brightness of image data in association with the product A.

FIG. 3 is a flowchart illustrating an example method of selecting, by the advertisement content providing apparatus 100, some parts from among a plurality of parts based on characteristics of the plurality of parts.

In operation S310, the advertisement content providing apparatus 100 may obtain an image of an advertisement target.

Moreover, operation S310 may correspond to operation S210 described above with reference to FIG. 2.

In operation S320, the advertisement content providing apparatus 100 may select at least some parts from among a plurality of parts which are generated by segmenting the obtained image based on time, based on a degree of shaking of each of the plurality of parts and a similarity between the plurality of parts.

The advertisement content providing apparatus 100 may select a part, which is not large in degree of shaking of a camera at the moment to photograph an advertisement target, from among a plurality of parts. For example, the degree of shaking denotes a degree to which an image is captured in a state of being shaken due to shaking of the camera at the moment to photograph the advertisement target. For example, the advertisement content providing apparatus 100 may measure a movement of each of the plurality of parts to determine a degree of shaking. The advertisement content providing apparatus 100 may select parts where a degree of shaking is less than a predetermined value, based on the determined degree of shaking.

According to another example embodiment, the advertisement content providing apparatus 100 may select at least some parts from among a plurality of parts, based on a similarity between the plurality of parts. For example, the advertisement content providing apparatus 100 may compare data included in a first part with data included in a second part to determine a similarity between the first part and the second part, and when it is determined that the similarity between the first part and the second part is equal to or greater than the predetermined value, the advertisement content providing apparatus 100 may, for example, select only one of the first part and the second part.

According to the above-described example embodiment, the advertisement content providing apparatus 100 may select at least some parts from among a plurality of parts, based on characteristic of each of the plurality of parts, thereby creating advertisement content which enables information about an advertisement target to be clearly and concisely be transferred.

FIG. 4 is a diagram illustrating an example method of selecting, by the advertisement content providing apparatus 100, some parts from among a plurality of parts based on characteristics of the plurality of parts.

Referring to FIG. 4, the advertisement content providing apparatus 100 may obtain an image 400 captured by photographing an ice cream which is an advertisement target. For example, the advertisement content providing apparatus 100 may photograph the ice cream using the camera included therein. According to another example embodiment, the advertisement content providing apparatus 100 may obtain the image 400, captured by photographing the ice cream, from an external image photographing device.

The advertisement content providing apparatus 100 may segment the captured image 400 of the ice cream into a plurality of parts 410 to 450, based on time. For example, each of the plurality of parts 410 to 450 may include at least one frame.

The advertisement content providing apparatus 100 may select at least some parts from among the plurality of parts, based on a degree of shaking of each of the plurality of parts and a similarity between the plurality of parts. For example, the advertisement content providing apparatus 100 may select a first part 410, a third part 430, and a fifth part 450 which satisfy a degree of shaking which is less than a predetermined value and a similarity with a previous part which is greater than a predetermined value.

FIG. 5 is a diagram illustrating an example method of providing, by an advertisement content providing apparatus 500, information necessary for creating advertisement content corresponding to an image obtained by photographing an advertisement target.

The advertisement content providing apparatus 500 may photograph an ice cream, which is an advertisement target 510, using a camera included therein. In photographing an advertisement target, the advertisement content providing apparatus 500 may provide information about parts capable of being selected as advertisement content, based on a degree of shaking of each of photographed parts and a similarity between the photographed parts.

For example, the advertisement content providing apparatus 500 may provide information indicating that a length of a part, satisfying a predetermined degree of shaking and a predetermined similarity among a plurality parts which are obtained in real time until a photographing time in capturing an image of an ice cream, is 20 seconds. When a length of advertisement content which is to be created by a user is 50 seconds, as illustrated, for example, in FIG. 5, the advertisement content providing apparatus 500 may provide, through a progress bar 520, information 530 indicating that a length of parts which are selected so as to be used for advertisement content in images captured until a current time is 20 seconds.

However, this is merely an embodiment. In other example embodiments, the advertisement content providing apparatus 500 may provide guide information which is necessary for photographing an advertisement target and includes brightness and contrast of a captured image, in addition to reproduction time information about selected parts.

Figure 6:
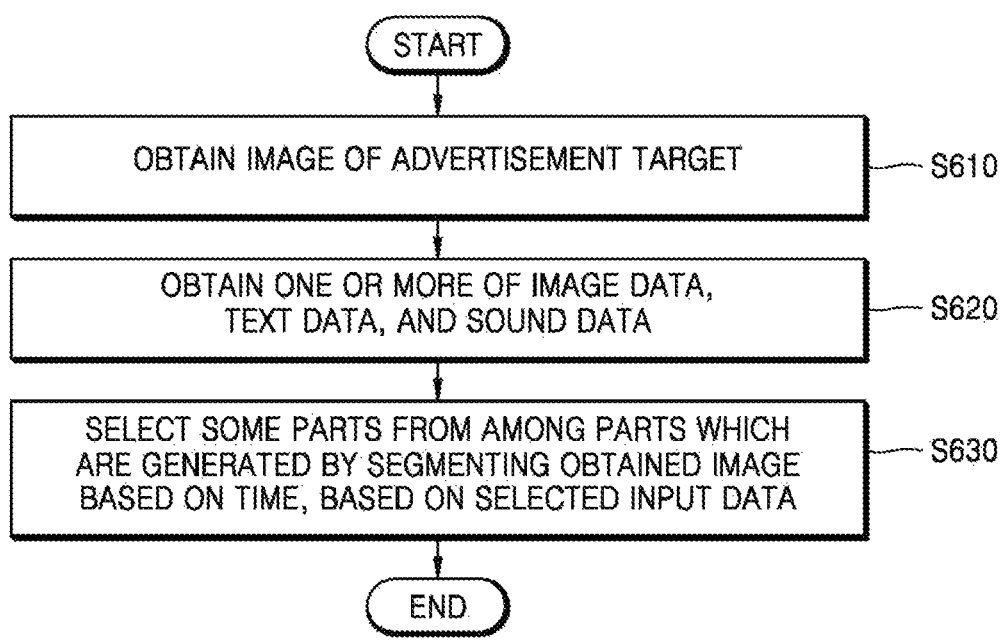
FIG. 6 is a flowchart illustrating an example method of selecting, by an advertisement content providing apparatus, at least some parts from among a plurality of parts included in an image of an advertisement target based on obtained input data.

FIG. 6 is a flowchart illustrating an example method of selecting, by the advertisement content providing apparatus 100, at least some parts from among a plurality of parts included in an image of an advertisement target based on obtained user input data.

In operation S610, the advertisement content providing apparatus 100 may obtain an image of an advertisement target.

Moreover, operation S610 may correspond to operation S210 described above with reference to FIG. 2.

In operation S620, the advertisement content providing apparatus 100 may obtain input data (e.g., including user input data) including one or more of image data, text data, and sound data, for creating advertisement content. For example, the input data may be data selected by the user.

The advertisement content providing apparatus 100 may select at least one piece of data from among the image data, the text data, and the sound data which are previously stored in a memory of the advertisement content providing apparatus 100, based on an input. The advertisement content providing apparatus 100 may display, for example, a list including identification information of each of the image data, the text data, and the sound data which are available for creating advertisement content. The user may select data, which is to be used to create advertisement content for a product A, from the displayed list.

However, this is merely an embodiment. In other example embodiments, the user may input identification information about the data, which is to be used to the create advertisement content for the product A, to the advertisement content providing apparatus 100 and thus, the advertisement content providing apparatus 100 may obtain data, corresponding to identification information input, for example, by the user, from an external device.

In operation S630, the advertisement content providing apparatus 100 may select at least some parts from among a plurality of parts which are generated by segmenting the obtained image based on time, based on the selected input data.

When the user input data is text data, the advertisement content providing apparatus 100 according to an embodiment may select parts, including an item indicated by the text data, from among the plurality of parts. For example, when text data "ice cream" is selected, the advertisement content providing apparatus 100 may select parts including an ice cream from the obtained image.

According to another example embodiment, when the input data is image data, the advertisement content providing apparatus 100 may select parts, including an item indicated by the image data, from among the plurality of parts. For example, when an image of an ice cream is selected, the advertisement content providing apparatus 100 may select parts including the ice cream from the obtained image.

According to another example embodiment, when the input data is sound data, the advertisement content providing apparatus 100 may select parts, including an item indicated by the sound data, from among the plurality of parts. For example, when voice data "ice cream" is selected, the advertisement content providing apparatus 100 may select parts including an ice cream from the obtained image.

According to another example embodiment, when the input data is sound data, the advertisement content providing apparatus 100 may select some parts from among a plurality of parts, based on the changes in the number of bits or tempo of the sound data. For example, the advertisement content providing apparatus 100 may select a part, corresponding to a time when tempo of a song A is changed, from among the plurality of parts.

The above-described embodiment is merely an embodiment for describing a method of selecting, by the advertisement content providing apparatus 100, at least some parts from among a plurality of parts based on input data, and the present embodiment is not limited thereto.

Figure 7:
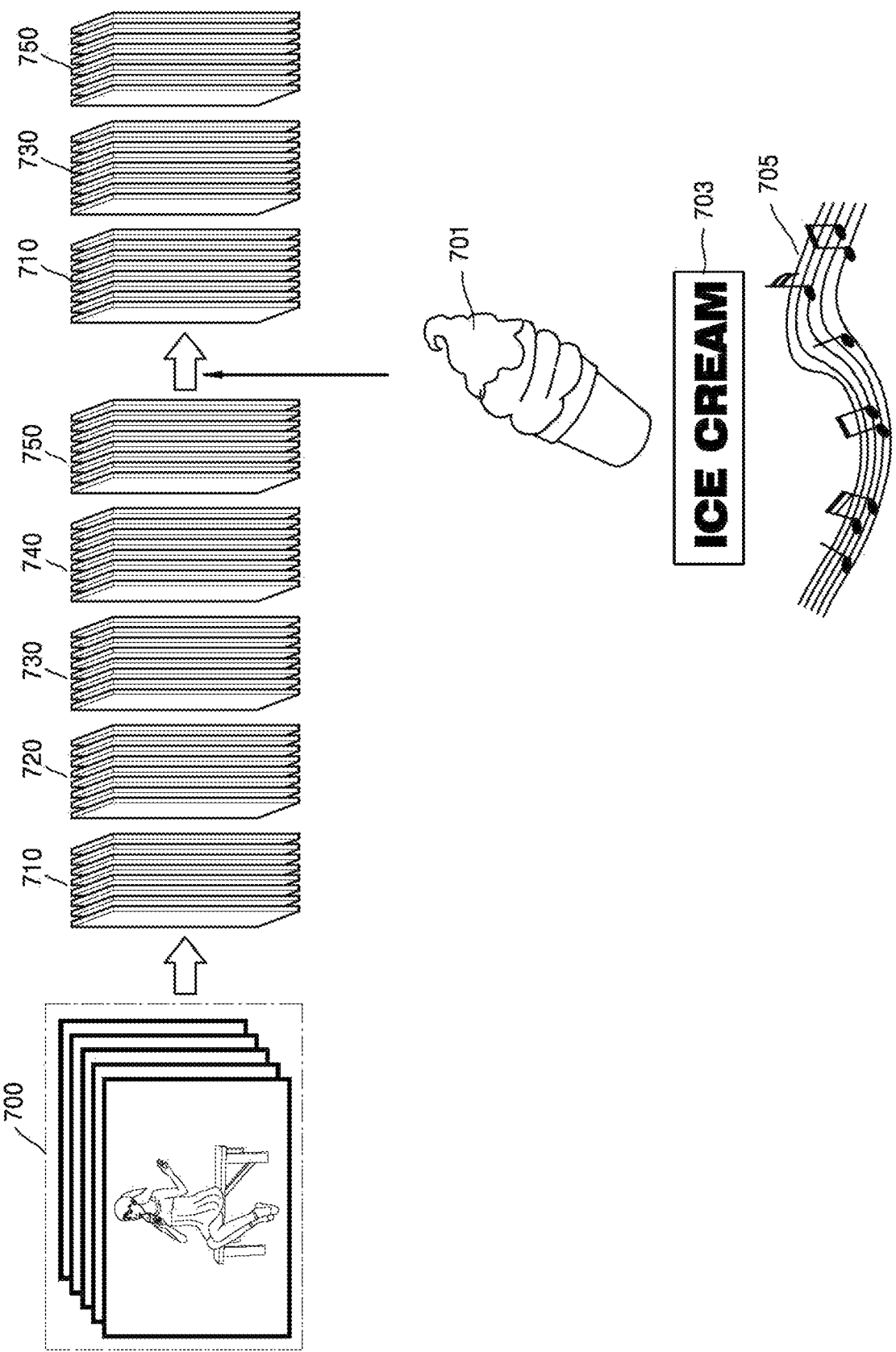
FIG. 7 is a diagram illustrating an example method of selecting, by an advertisement content providing apparatus, at least some parts from among a plurality of parts included in an image of an advertisement target based on obtained input data.

FIG. 7 is a diagram illustrating an example method of selecting, by the advertisement content providing apparatus 100, at least some parts from among a plurality of parts included in an image of an advertisement target based on obtained user input data.

Referring to FIG. 7, the advertisement content providing apparatus 100 may segment an image 700, obtained by photographing an advertisement target, into a plurality of parts 710 to 750. For example, each of the plurality of parts 710 to 750 may include at least one frame.

The advertisement content providing apparatus 100 may obtain at least one of image data 701, text data 703, and sound data 705, based on an input, such as, for example, a user input.

The advertisement content providing apparatus 100 may select the parts 710, 730 and 750, including an item corresponding to an obtained ice cream image, from the image of the advertisement target. Also, the advertisement content providing apparatus 100 may select a part (for example, 730) including an item having the same shape and color as those of the obtained ice cream image, based on a degree of precision selected, for example, by a user. For example, when the degree of precision selected by the user is 1, all parts (for example, 710, 730 and 750) including an ice cream in an image may be selected. As another example, when the degree of precision selected by the user is 4, the advertisement content providing apparatus 100 may select a part (for example, 730) an item having the same shape and color as those of the obtained ice cream image in the image.

According to another example embodiment, the advertisement content providing apparatus 100 may select parts (for example, 710, 730 and 750) including an ice cream, which is an item indicated by text data, from an image of an advertisement target.

According to another example embodiment, the advertisement content providing apparatus 100 may reproduce an advertisement target and sound data A and then select parts (for example, 710, 720 and 740) corresponding to a point where tempo of the sound data A is changed. As another example, when obtained sound data is voice data, the advertisement content providing apparatus 100 may select parts (for example, 710, 730 and 750), including an item indicated by the voice data, from an image.

Figure 8:
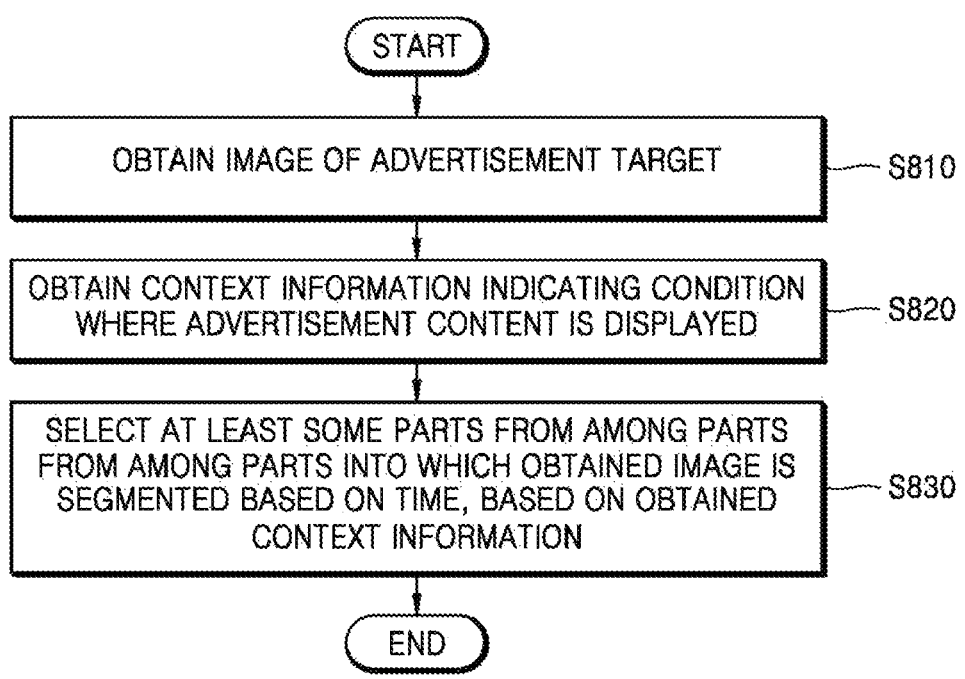
FIG. 8 is a flowchart illustrating an example method of selecting, by an advertisement content providing apparatus, at least some parts from among a plurality of parts included in an image of an advertisement target based on context information.

FIG. 8 is a flowchart illustrating an example method of selecting, by the advertisement content providing apparatus 100, at least some parts from among a plurality of parts included in an image of an advertisement target based on context information.

In operation S810, the advertisement content providing apparatus 100 may obtain an image of an advertisement target.

Moreover, operation S810 may correspond to operation S210 described above with reference to FIG. 2.

In operation S820, the advertisement content providing apparatus 100 may obtain context information indicating a condition where advertisement content is displayed.

The advertisement content providing apparatus 100 may obtain information about a position and a time where the advertisement content is displayed. For example, the advertisement content providing apparatus 100 may obtain information indicating that the advertisement content will be displayed at 1 p.m. at K crossroads where employees are concentrated.

According to another example embodiment, the advertisement content providing apparatus 100 may obtain information about a display device displaying advertisement content. For example, the advertisement content providing apparatus 100 may obtain information indicating that advertisement content is displayed by a digital signage device including a screen where a ratio of width to height is 1:2.

According to another example embodiment, the advertisement content providing apparatus 100 may obtain profile information about a viewer viewing advertisement content. For example, the advertisement content providing apparatus 100 may obtain information indicating that 60% of viewers viewing the advertisement content are women in her 30s.

In operation S830, the advertisement content providing apparatus 100 may select at least some parts from among a plurality of parts into which the obtained image is segmented based on time, based on the obtained context information.

The advertisement content providing apparatus 100 may select at least some parts from among a plurality of parts, based on a position and a time where advertisement content is displayed. For example, when advertisement content is displayed at 8 a.m. at K crossroads where employees are concentrated, the advertisement content providing apparatus 100 may select a part corresponding to a 10-second length where an advertisement target is the most sharply photographed, for transferring information for a short time.

According to another example embodiment, when advertisement content is displayed by a digital signage device where a height ratio is greater than a width ratio, the advertisement content providing apparatus 100 may select parts, where a height ratio photographed is greater, from a captured image.

According to another example embodiment, when 70% of viewers viewing advertisement content are men, the advertisement content providing apparatus 100 may select parts, where a woman model appears, from a captured image.

The above-described example embodiment is merely an embodiment for describing a method of selecting, by the advertisement content providing apparatus 100, at least some parts from among a plurality of parts included in a captured image, and the present embodiment is not limited thereto.

Figure 9:
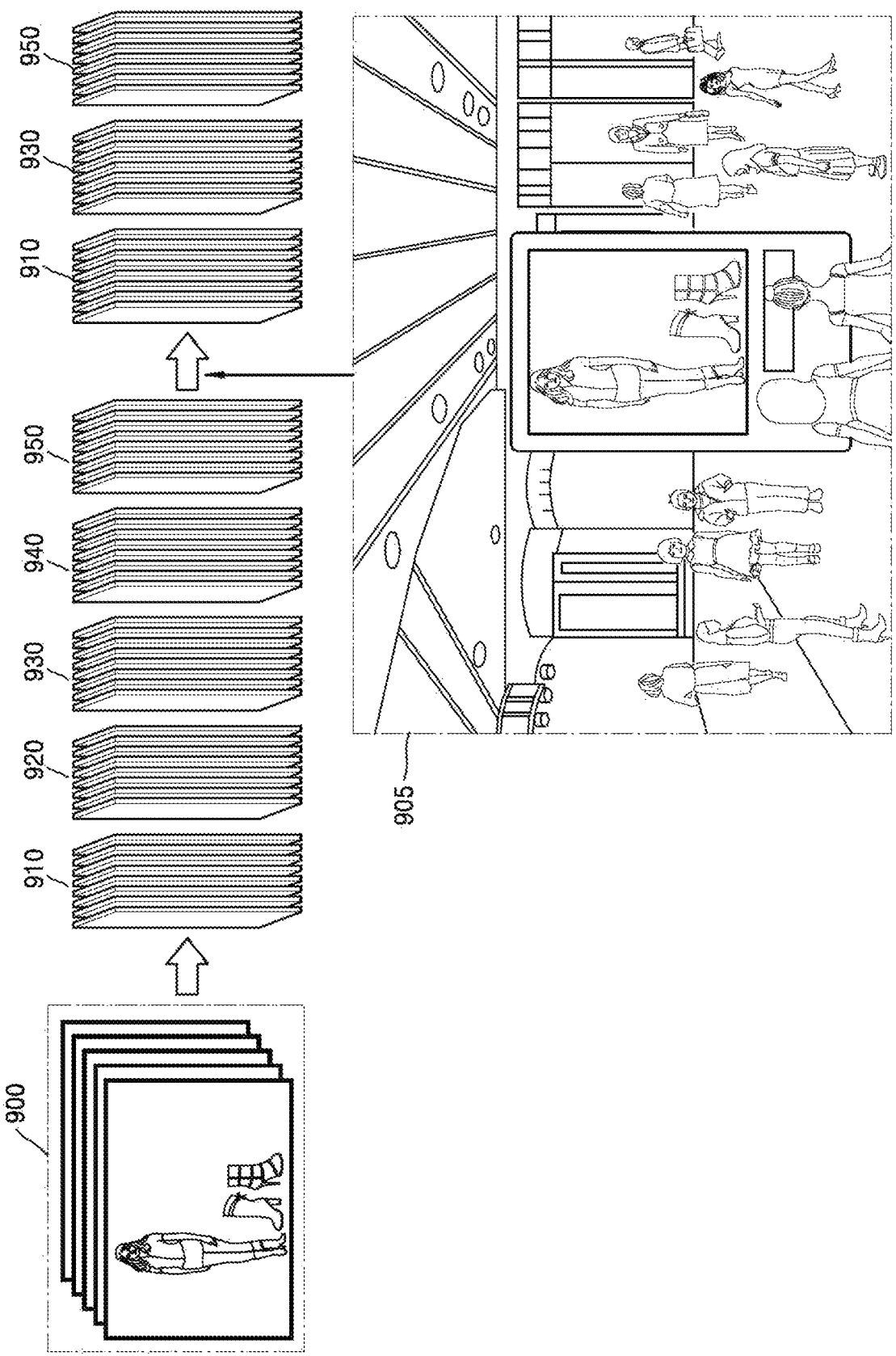
FIG. 9 is a diagram illustrating an example method of selecting, by an advertisement content providing apparatus, at least some parts from among a plurality of parts included in an image of an advertisement target based on context information.

FIG. 9 is a diagram illustrating an example method of selecting, by the advertisement content providing apparatus 100, at least some parts from among a plurality of parts included in an image of an advertisement target based on context information.

Referring to FIG. 9, the advertisement content providing apparatus 100 may segment an image 900, obtained by photographing an advertisement target, into a plurality of parts 910 to 950, based on time. For example, each of the plurality of parts 910 to 950 may include at least one frame.

The advertisement content providing apparatus 100 may obtain context information indicating that advertisement content will be displayed at 3 p.m. on Saturday at H crossroads where shopping malls are concentrated. Also, the advertisement content providing apparatus 100 may obtain information indicating that 70% of viewers viewing the advertisement content are women in her 20s and 30s.

The advertisement content providing apparatus 100 may select parts (for example, 910, 930 and 950), including an image where a woman model wears shoes A, from an image obtained by photographing the shoes A which are an advertisement target, based on the obtained context information. Also, the advertisement content providing apparatus 100 may select parts (for example, 920, 930 and 950), including a captured image where a background has a color preferred by women, from the image obtained by photographing the shoes A.

Figure 10:
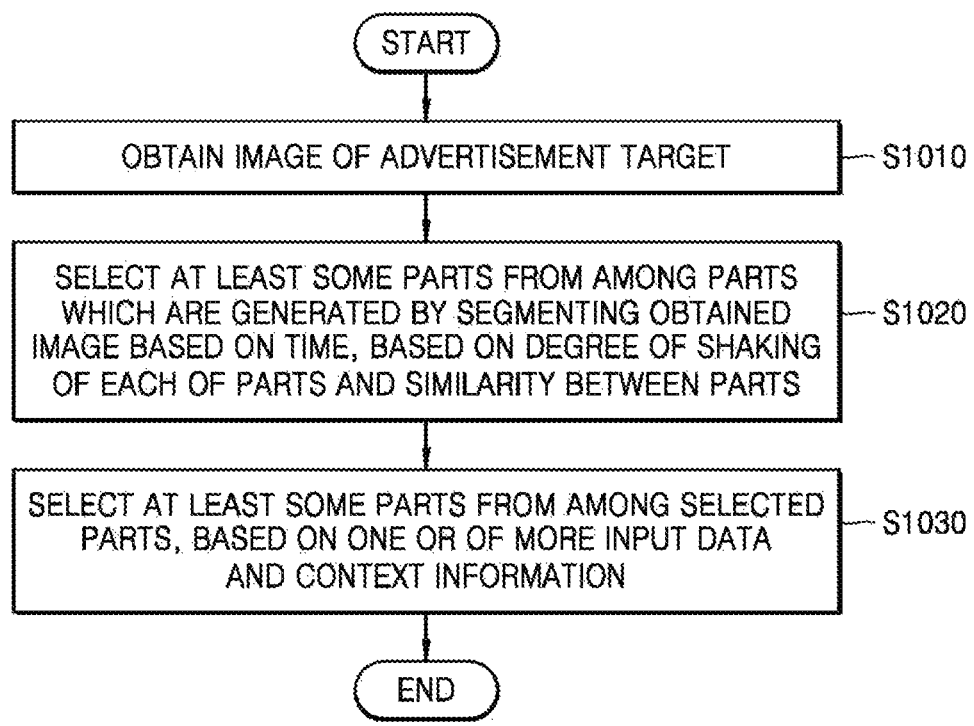
FIG. 10 is a flowchart illustrating an example method of selecting, by an advertisement content providing apparatus, at least some parts from among a plurality of parts included in a captured image based on characteristics of the plurality of parts and input data.

FIG. 10 is a flowchart illustrating an example method of selecting, by the advertisement content providing apparatus 100, at least some parts from among a plurality of parts included in a captured image based on characteristics of the plurality of parts and user input data.

In operation S1010, the advertisement content providing apparatus 100 may obtain an image of an advertisement target.

Moreover, operation S1010 may correspond to operation S210 described above with reference to FIG. 2.

In operation S1020, the advertisement content providing apparatus 100 may select at least some parts from among a plurality of parts which are generated by segmenting the obtained image based on time, based on a degree of shaking of each of the plurality of parts and a similarity between the plurality of parts.

The advertisement content providing apparatus 100 may determine the degree of shaking of each of the plurality of parts and the similarity between the plurality of parts. The advertisement content providing apparatus 100 may select parts, where a degree of shaking is less than a predetermined value and a similarity therebetween is less than a predetermined value, from among the plurality of parts.

For example, the advertisement content providing apparatus 100 may select a first part, a third part, and a fifth part from among five parts included in a captured image, based on a degree of shaking and a similarity therebetween.

A method of selecting, by the advertisement content providing apparatus 100, at least some parts from among a plurality of parts based on a degree of shaking and a similarity therebetween may correspond to the method described above with reference to FIG. 3.

In operation S1030, the advertisement content providing apparatus 100 may select at least some parts from among the selected parts, based on one or more of input data and context information.

The advertisement content providing apparatus 100 may select at least some parts from among the parts selected based on a degree of shaking and a similarity therebetween, based on the input data. For example, the advertisement content providing apparatus 100 may select a part, including an ice cream of image data selected by a user, from among the selected first part, third part, and fifth part.

Moreover, the advertisement content providing apparatus 100 may select at least some parts from among the parts selected based on a degree of shaking and a similarity therebetween, based on context information about a condition where advertisement content is displayed.

Figure 11:
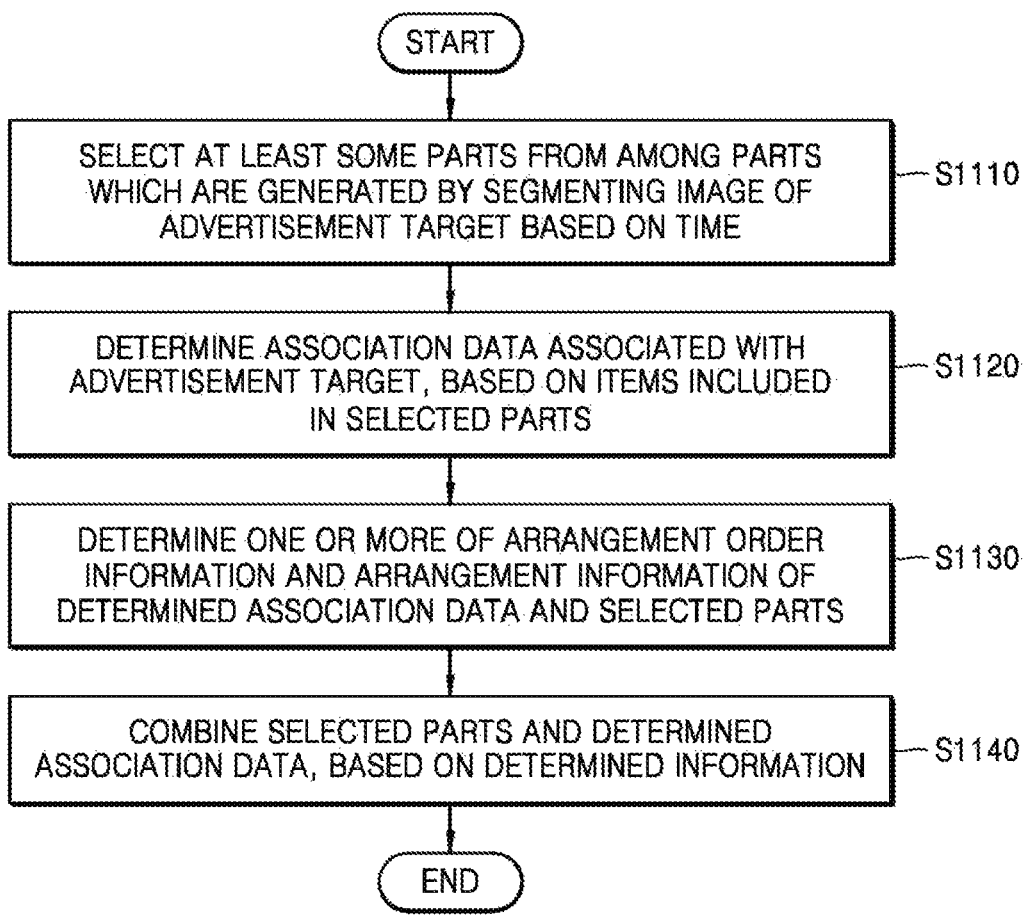
FIG. 11 is a flowchart illustrating an example method of determining, by an advertisement content providing apparatus, association data associated with an advertisement target to create advertisement content.

FIG. 11 is a flowchart illustrating an example method of determining, by the advertisement content providing apparatus 100, association data associated with an advertisement target to create advertisement content.

In operation S1110, the advertisement content providing apparatus 100 may select at least some parts from among a plurality of parts which are generated by segmenting an image of an advertisement target based on time.

Moreover, operation S1110 may correspond to operation S210 described above with reference to FIG. 2.

In operation S1120, the advertisement content providing apparatus 100 may determine association data associated with the advertisement target, based on one or more items included in the selected parts and the advertisement target.

The advertisement content providing apparatus 100 may determine, as association data, at least one of text data, image data, and sound data for providing information about an advertisement target. For example, the advertisement content providing apparatus 100 may determine, as association data, text data and image data which indicate a name of an ice cream and a material of an ice cream for providing information about the ice cream which is an advertisement target. As another example, the advertisement content providing apparatus 100 may select image data indicating cool sea and text data indicating summer so as to effectively provide a merit of an ice cream which is an advertisement target.

Moreover, the advertisement content providing apparatus 100 may determine, as association data, data associated with items other than an advertisement target included in a captured image. For example, in an example of capturing an image where a woman model eats an ice cream, the advertisement content providing apparatus 100 may select an image, where a woman model stands by sea, as association data for providing a cool effect of the ice cream.

In operation S1130, the advertisement content providing apparatus 100 may determine one or more of arrangement order information and arrangement information of the determined association data and the selected parts.

The advertisement content providing apparatus 100 may determine the arrangement order information of the determined association data and the selected parts. For example, the advertisement content providing apparatus 100 may determine the arrangement order information, based on an input, such as, for example, a user input. As another example, the advertisement content providing apparatus 100 may determine arrangement order information, based on a similarity between items included in association data and parts. For example, the advertisement content providing apparatus 100 may determine arrangement order information so as to sequentially display a part and association data where a similarity between corresponding items is high.

Moreover, the advertisement content providing apparatus 100 may determine arrangement information about a position at which the association data is arranged on the selected parts. For example, the advertisement content providing apparatus 100 may identify an advertisement target in the selected parts to determine the arrangement information in order for the association data to be arranged at a certain distance from the identified advertisement target.

In operation S1140, the advertisement content providing apparatus 100 may combine the selected parts and the determined association data, based on the determined information.

The advertisement content providing apparatus 100 may combine the selected parts and the determined association data, based on the determined arrangement order information and the determined arrangement information, thereby creating advertisement content for an advertisement target.

Figure 12:
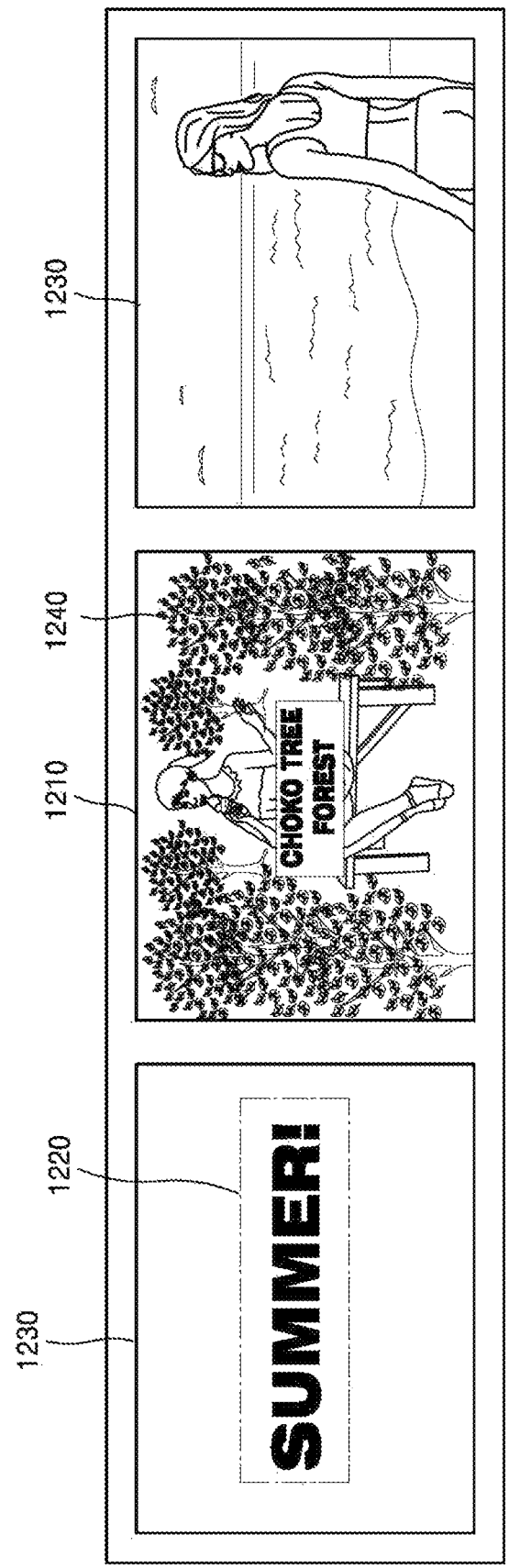
FIG. 12 is a diagram illustrating an example method of determining, by an advertisement content providing apparatus, association data associated with an advertisement target to create advertisement content.

FIG. 12 is a diagram illustrating an example method of determining, by the advertisement content providing apparatus 100, association data associated with an advertisement target to create advertisement content 1200.

Referring to FIG. 12, the advertisement content providing apparatus 100 may determine association data associated with an ice cream included in a selected part 1210. For example, the advertisement content providing apparatus 100 may select text data 1220 "SUMMER" and blue image data 1230 as the association data associated with the ice cream. Also, the advertisement content providing apparatus 100 may select forest image data 1240 as association data associated with a choko tree forest which is a name of the ice cream.

The advertisement content providing apparatus 100 may determine arrangement information in order for the selected text data 1220 "SUMMER" to be arranged on a center of the blue image data 1230, based on a user input. Also, the advertisement content providing apparatus 100 may arrange the forest image data 1240, associated with text data "choko tree forest" which is data included in the selected part, to be displayed after the selected part.

The above-described embodiment is merely an embodiment, and a method of determining, by the advertisement content providing apparatus 100, association data associated with an advertisement target to create advertisement content is not limited thereto.

Figure 13:
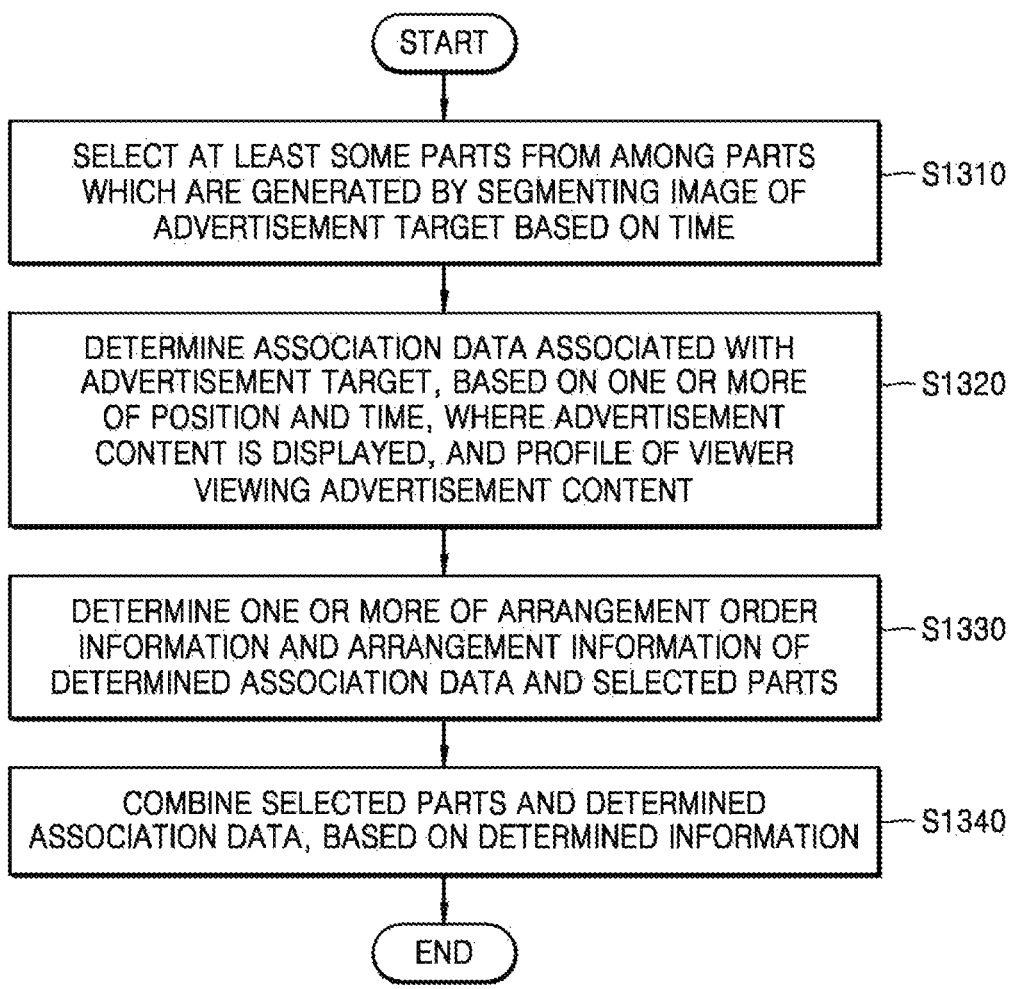
FIG. 13 is a flowchart illustrating an example method of determining, by an advertisement content providing apparatus, association data associated with an advertisement target based on context information.

FIG. 13 is a flowchart illustrating an example method of determining, by the advertisement content providing apparatus 100, association data associated with an advertisement target based on context information.

In operation S1310, the advertisement content providing apparatus 100 may select at least some parts from among a plurality of parts which are generated by segmenting an image of an advertisement target based on time.

Moreover, operation S1310 may correspond to operation S210 described above with reference to FIG. 2.

In operation S1320, the advertisement content providing apparatus 100 may determine association data associated with the advertisement target, based on one or more of a position and a time, where advertisement content is displayed, and a profile of a viewer viewing the advertisement content.

The advertisement content providing apparatus 100 may determine the association data, based on the position and the time where advertisement content is displayed. For example, when the position where advertisement content is displayed is a university campus, the advertisement content providing apparatus 100 may determine, as association data, a scene associated with an advertisement target in an entertainment program where interest of university students is high. For example, the advertisement content providing apparatus 100 may determine, as association data, a scene including image data, text data, and sound data indicating the advertisement target in the entertainment program.

According to another example embodiment, the advertisement content providing apparatus 100 may determine association data associated with an advertisement target, based on a profile of a viewer viewing advertisement content. For example, when 70% of viewers viewing the advertisement content are girl students in her 10s, the advertisement content providing apparatus 100 may determine, as association data, image data associated with an advertisement target among pieces of image data of an idol entertainer having a high profile.

In operation S1330, the advertisement content providing apparatus 100 may determine one or more of arrangement order information and arrangement information of the determined association data and the selected parts.

Moreover, operation S1330 may correspond to operation S1130 described above with reference to FIG. 11.

In operation S1340, the advertisement content providing apparatus 100 may combine the selected parts and the determined association data, based on the determined information.

Moreover, operation S1330 may correspond to operation S1140 described above with reference to FIG. 11.

Figure 14:
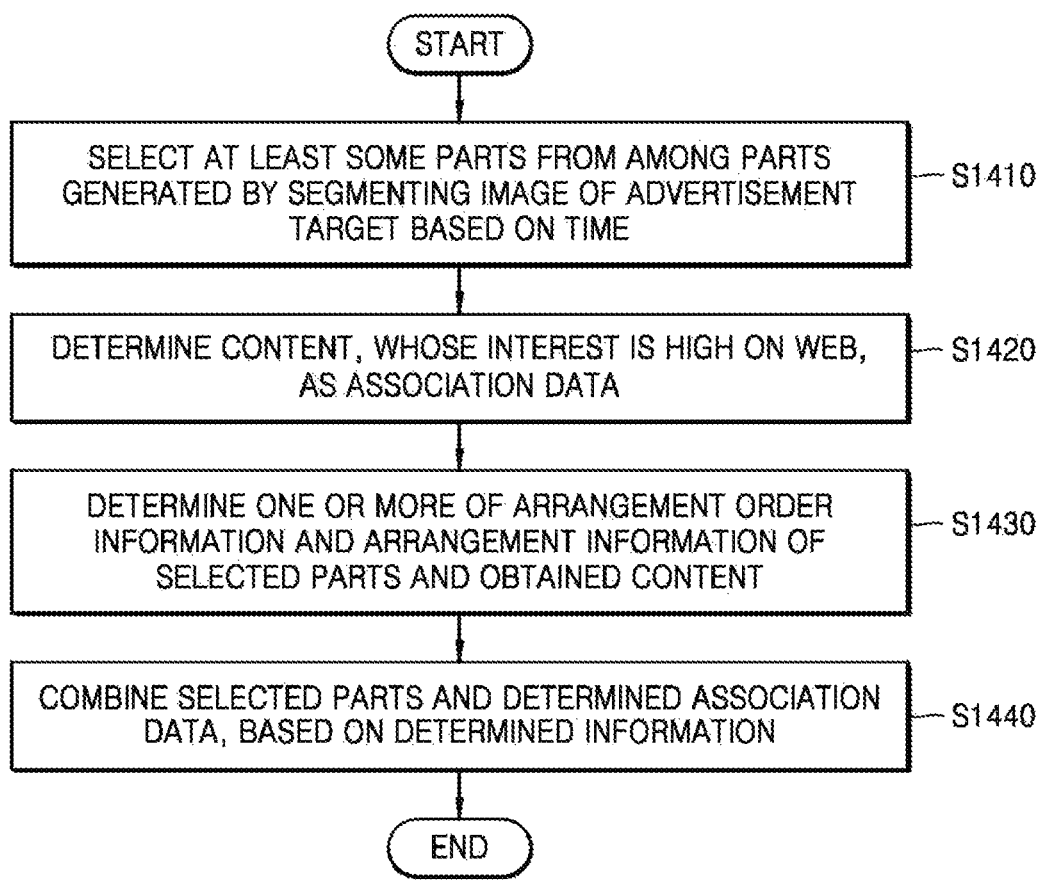
FIG. 14 is a flowchart illustrating an example method of determining, by an advertisement content providing apparatus, high-interest data as association data associated with an advertisement target on the Web to provide advertisement content.

FIG. 14 is a flowchart illustrating an example method of determining, by the advertisement content providing apparatus 100, high-interest data as association data associated with an advertisement target on the Web to provide advertisement content.

In operation S1410, the advertisement content providing apparatus 100 may select at least some parts from among a plurality of parts which are generated by segmenting an image of an advertisement target based on time.

Moreover, operation S1410 may correspond to operation S210 described above with reference to FIG. 2.

In operation S1420, the advertisement content providing apparatus 100 may determine content, whose interest is high on the Web, as association data.

For example, the advertisement content providing apparatus 100 may obtain content, which is ranked in a real-time searching word list provided on a portable site, from an external device. As another example, the advertisement content providing apparatus 100 may automatically obtain content, which is ranked in the real-time searching word list, from an external device. When pieces of content are ranked in the real-time searching word list, the advertisement content providing apparatus 100 may obtain content associated with an advertisement target from among the pieces of content.

As another example, the advertisement content providing apparatus 100 may obtain content which is shared by many persons on a web site. For example, the advertisement content providing apparatus 100 may obtain a music video or music for which hits are high.

The advertisement content providing apparatus 100 may increase interest of viewers for an advertisement target by using high-interest content as association data.

In operation S1430, the advertisement content providing apparatus 100 may determine one or more of arrangement order information and arrangement information of the selected parts and the obtained content.

In operation S1440, the advertisement content providing apparatus 100 may combine the selected parts and the determined association data, based on the determined information.

The advertisement content providing apparatus 100 may combine the selected parts and the determined association data to create advertisement content and may provide the advertisement content to a display device. This is merely an embodiment, and the advertisement content providing apparatus 100 may display the created advertisement content.

FIG. 15 is a diagram illustrating an example method of determining, by the advertisement content providing apparatus 100, high-interest data as association data associated with an advertisement target on the Web to provide advertisement content.

Referring to FIG. 15, the advertisement content providing apparatus 100 may select a music video 1520, for which hits are the highest, on a video sharing site. The advertisement content providing apparatus 100 may determine the selected music video 1520 as association data associated with an advertisement target.

The advertisement content providing apparatus 100 may combine a selected part 1510 and the selected music video 1520 to create advertisement content 1530. For example, the advertisement content providing apparatus 100 may determine arrangement order information in order for the selected music video 1520 to be displayed after the part 1510 including images of a smartphone which is an advertisement target is displayed. Also, the advertisement content providing apparatus 100 may determine arrangement information in order for a name of a company, which has created the advertisement target, to be marked on a captured image of a certain scene included in the selected music video 1520.

The advertisement content providing apparatus 100 may combine the selected part 1510 and the content 1520 whose interest is high on the Web, based on the determined arrangement order information and arrangement information, thereby creating the advertisement content 1530.

The above-described embodiment is merely an embodiment, and a method of creating, by the advertisement content providing apparatus 100, advertisement content by using content whose interest is high on the Web is not limited thereto.

Figure 16A:
FIGS. 16A-16C are diagrams illustrating an example method of providing, by an advertisement content providing apparatus, advertisement content based on characteristic of a device displaying the advertisement content.
Figure 16B:
Figure 16C:
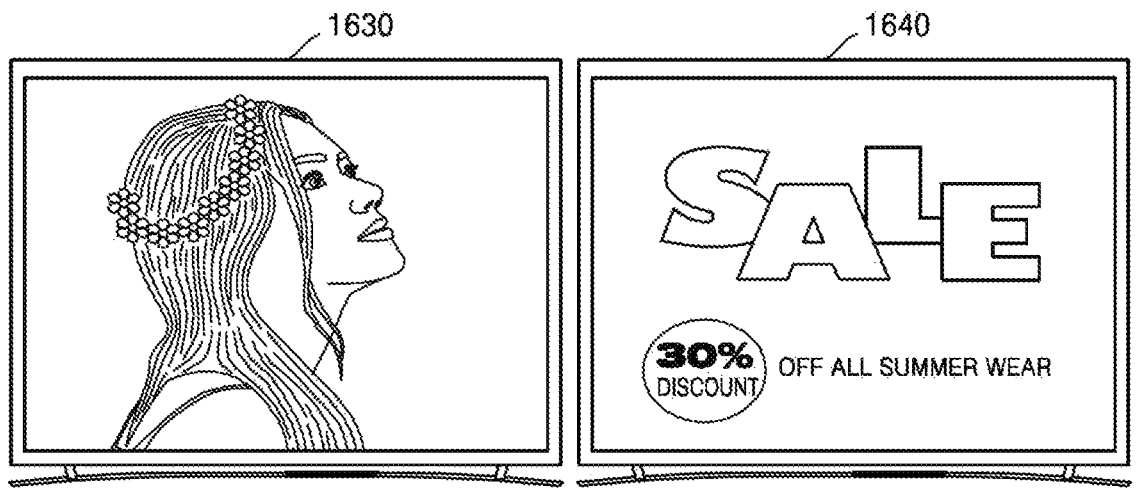

FIGS. 16A-16C are diagrams illustrating an example method of providing, by the advertisement content providing apparatus 100, advertisement content based on characteristic of a device displaying the advertisement content.

FIG. 16A illustrates a first digital signage device 1610 where a vertical length is longer than a horizontal length. The advertisement content providing apparatus 100 may obtain information about the shapes and number of digital signage devices displaying advertisement content.

The advertisement content providing apparatus 100 may determine arrangement information about selected parts and association data, based on the obtained information. For example, the advertisement content providing apparatus 100 may determine arrangement information in order for association data of a selected part to be arranged below the selected part, based on information about where the vertical length is two times the horizontal length in the first digital signage device 1610.

FIG. 16B illustrates a second digital signage device 1620 where a horizontal length is longer than a vertical length. The advertisement content providing apparatus 100 may obtain information about the shapes and number of digital signage devices displaying advertisement content.

The advertisement content providing apparatus 100 may determine arrangement information about selected parts and association data, based on the obtained information. For example, the advertisement content providing apparatus 100 may determine arrangement information in order for association data of a selected part to be arranged on the right of the selected part, based on information about where the horizontal length is two times the vertical length in the second digital signage device 1620.

FIG. 16C illustrates a third digital signage device 1630 and a fourth digital signage device 1640, where a horizontal length is longer than a vertical length. The advertisement content providing apparatus 100 may obtain information about the shapes and number of digital signage devices displaying advertisement content.

The advertisement content providing apparatus 100 may determine arrangement information about selected parts and association data, based on the obtained information. For example, the advertisement content providing apparatus 100 may determine arrangement information in order for a selected part to be displayed by the third digital signage device 16430 and in order for association data to be displayed by the fourth digital signage device 1640, based on information about where there are two digital signage devices where a horizontal length is two times a vertical length.

Figure 17:
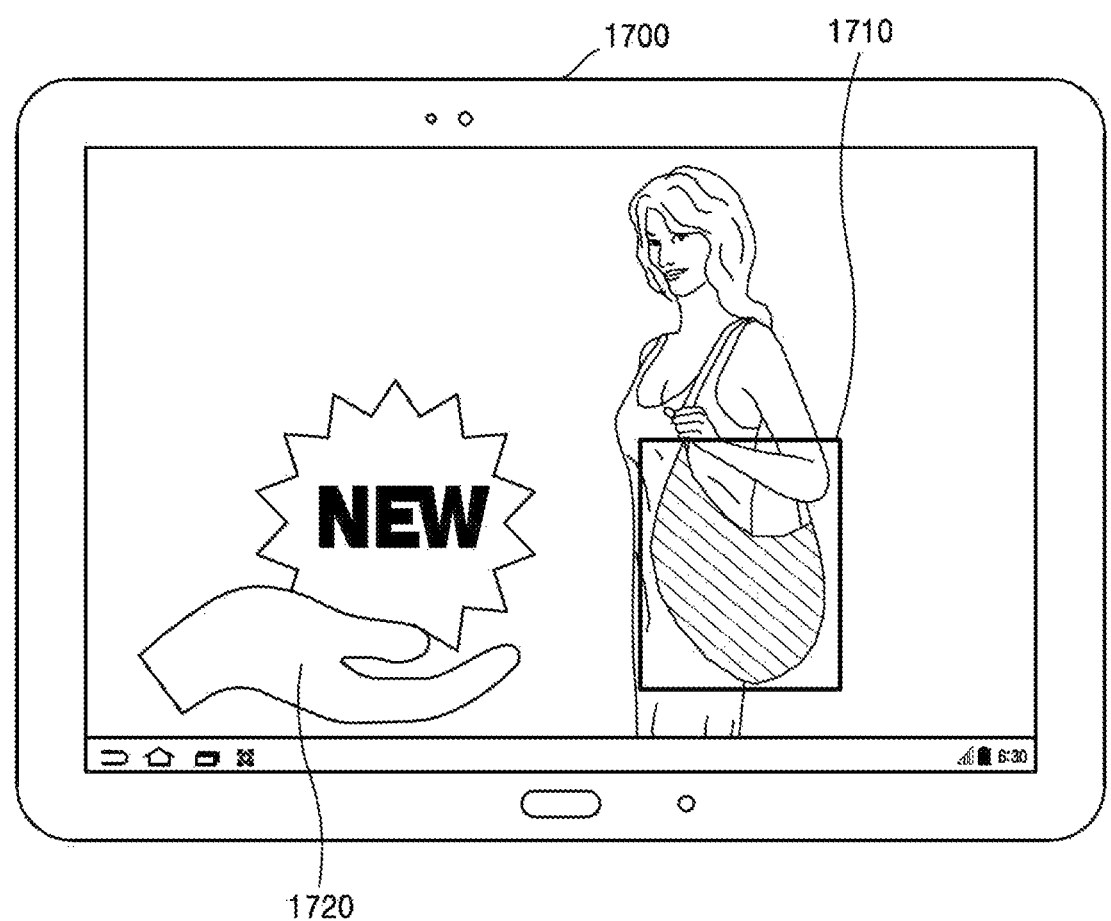
FIG. 17 is a diagram illustrating an example method of determining, by an advertisement content providing apparatus, arrangement information of associated data marked on a part from which advertisement content has been selected.

FIG. 17 is a diagram illustrating an example method of determining, by an advertisement content providing apparatus 1700, arrangement information of associated data marked on a part from which advertisement content has been selected.

Referring to FIG. 17, the advertisement content providing apparatus 1700 may identify an advertisement target in a selected part. For example, in an image of a bag which is the advertisement target, other items in addition to the bag may be included in the selected part. For example, referring to FIG. 17, a woman model wearing the bag may be included in the selected part.

The advertisement content providing apparatus 1700 may identify the advertisement target in the selected part using a pre-stored image of the advertisement target. For example, the advertisement content providing apparatus 1700 may identify a bag 1710 in the selected part.

The advertisement content providing apparatus 1700 may arrange association data near the identified bag 1710. For example, the advertisement content providing apparatus 1700 may arrange image data, including a text "NEW" indicating a newly-designed product, near the bag 1710.

The advertisement content providing apparatus 1700 may identify an advertisement target in a selected part and may automatically arrange association data, thereby creating advertisement content for more easily providing information about the advertisement target.

Figure 18:
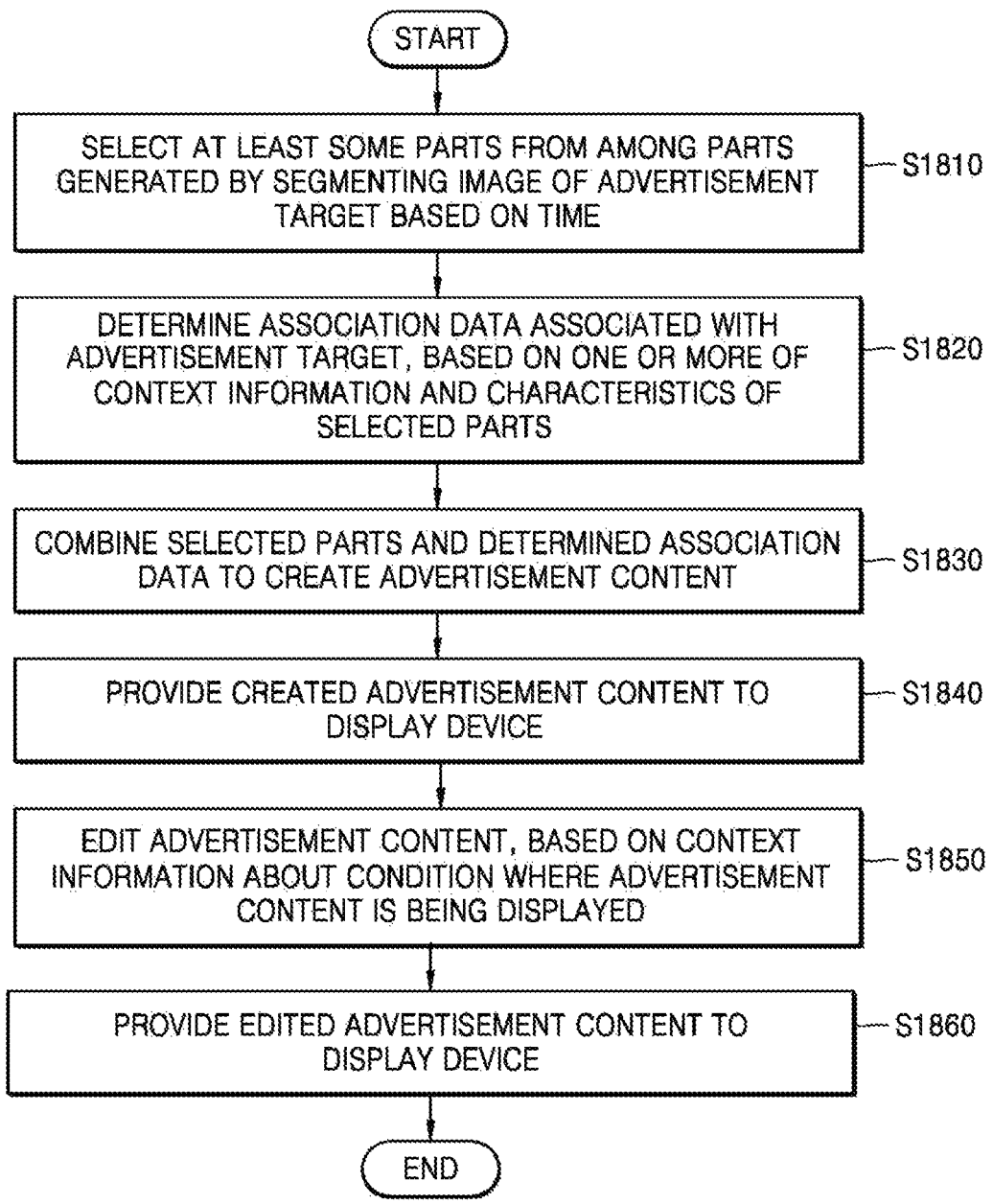
FIG. 18 is a flowchart illustrating an example method of editing, by an advertisement content providing apparatus, created advertisement content using context information about a condition where the created advertisement content is being displayed.

FIG. 18 is a flowchart illustrating an example method of editing, by the advertisement content providing apparatus 100, created advertisement content by using context information about a condition where the created advertisement content is being displayed.

In operation S1810, the advertisement content providing apparatus 100 may select at least some parts from among a plurality of parts which are generated by segmenting an image of an advertisement target based on time.

In operation S1820, the advertisement content providing apparatus 100 may determine association data associated with the advertisement target, based on one or more of context information and characteristics of the selected parts.

In operation S1830, the advertisement content providing apparatus 100 may combine the selected parts and the determined association data to create advertisement content.

In operation S1840, the advertisement content providing apparatus 100 may display the created advertisement content.

In operation S1850, the advertisement content providing apparatus 100 may edit the advertisement content, based on context information about a condition where the advertisement content is being displayed.

The advertisement content providing apparatus 100 may obtain in real time the context information about the condition where the advertisement content is being displayed. For example, the context information may include time and profile information about viewers.

For example, the advertisement content providing apparatus 100 may adjust a reproduction duration of advertisement content according to a change in time when the advertisement content is displayed. For example, the advertisement content providing apparatus 100 may remove some of parts included in the advertisement content and a portion of association data so as to compressively transfer information about an advertisement target at a time when a floating population is large, thereby decreasing the reproduction duration of the advertisement content. For example, information about the removed some parts and association data may be previously stored in creating the advertisement content. Also, as another example, the advertisement content providing apparatus 100 may remove a part or association data which is relatively low in degree of interest, based on profile information about a viewer viewing advertisement content.

As another example, the advertisement content providing apparatus 100 may change a plurality of parts selected from an image of advertisement content or may change association data. For example, in a case where viewers are determined as men in his 30s and parts including a woman model are selected from an image, the advertisement content providing apparatus 100 may obtain in real time context information indicating that viewers are girl students in her 10s, and thus may change the selected parts to parts including a man model.

As described above, the advertisement content providing apparatus 100 may change data included in advertisement content, based on context information which is obtained in real time. Accordingly, the advertisement content providing apparatus 100 more effectively provides information about an advertisement target to a viewer in consideration of a condition where advertisement content is displayed.

In operation S1860, the advertisement content providing apparatus 100 may provide the edited advertisement content to a display device. The display device may display the edited advertisement content. Also, the display device may transmit context information about a condition, where the advertisement content is displayed, to the advertisement content providing apparatus 100 in real time at certain periods.

Figure 19:
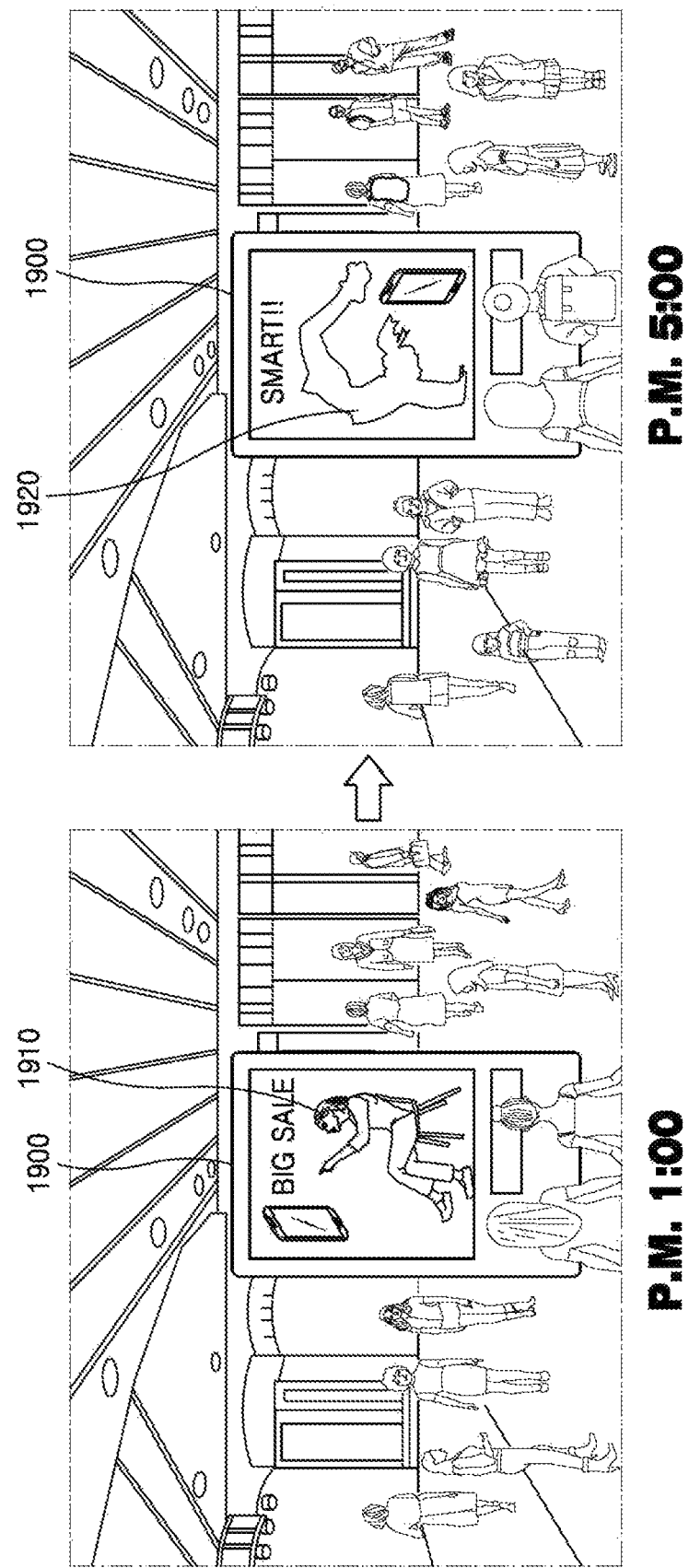
FIG. 19 is a diagram illustrating an example method of editing, by an advertisement content providing apparatus, created advertisement content using context information about a condition where the created advertisement content is being displayed.

FIG. 19 is a diagram illustrating an example method of editing, by the advertisement content providing apparatus 100, created advertisement content by using context information about a condition where the created advertisement content is being displayed.

Referring to FIG. 19, the advertisement content providing apparatus 100 may provide advertisement content for an S smartphone to a display device 1900.

The advertisement content providing apparatus 100 may select parts, where a woman in her 30s appears as a model, from an image associated with the S smartphone to create advertisement content, based on information about where 70% of viewers viewing advertisement content which is displayed by the display device 1900 at 1 p.m. are women in her 30s. The advertisement content providing apparatus 100 may provide the created advertisement content to the display device 1900.

Moreover, the advertisement content providing apparatus 100 may select parts, where an idol singer appears as a model, from the image associated with the S smartphone to edit advertisement content, based on information about where 90% of viewers viewing advertisement content which is displayed by the display device 1900 at 5 p.m. are students in their 10s. The advertisement content providing apparatus 100 may provide the edited advertisement content to the display device 1900.

Figure 20:
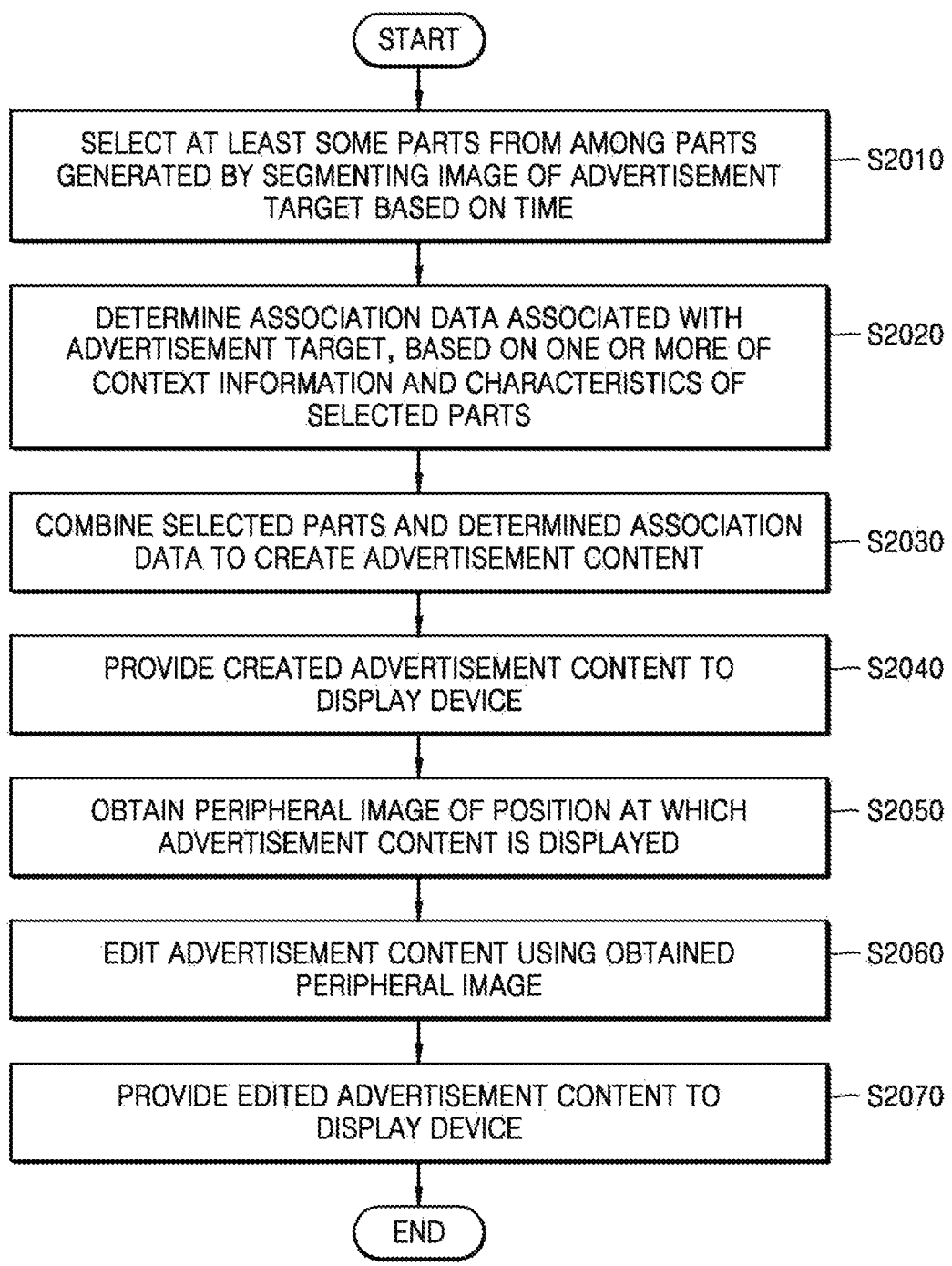
FIG. 20 is a flowchart illustrating an example method of editing, by an advertisement content providing apparatus, advertisement content using a peripheral image of a position at which the advertisement content is displayed.

FIG. 20 is a flowchart illustrating an example method of editing, by the advertisement content providing apparatus 100, advertisement content by using a peripheral image of a position at which the advertisement content is displayed.

In operation S2010, the advertisement content providing apparatus 100 may select at least some parts from among a plurality of parts which are generated by segmenting an image of an advertisement target based on time.

In operation S2020, the advertisement content providing apparatus 100 may determine association data associated with the advertisement target, based on one or more of context information and characteristics of the selected parts.

In operation S2030, the advertisement content providing apparatus 100 may combine the selected parts and the determined association data to create advertisement content.

In operation S2040, the advertisement content providing apparatus 100 may display the created advertisement content.

In operation S2050, the advertisement content providing apparatus 100 may obtain a peripheral image of a position at which the advertisement content is displayed.

The advertisement content providing apparatus 100 may obtain a peripheral image from a display device displaying advertisement content. As another example, the advertisement content providing apparatus 100 may obtain a peripheral image from an image photographing device located near a position at which advertisement content is displayed.

In operation S2060, the advertisement content providing apparatus 100 may edit the advertisement content using the obtained peripheral image.

The advertisement content providing apparatus 100 may change at least some data, included in advertisement content, to at least some data of an obtained image. For example, the advertisement content providing apparatus 100 may change an image, included in the advertisement content, to an image included in the obtained image. For example, the image which is changed may be an image of a target which is included in the advertisement content and the obtained image in common. For example, when an image of a building is included in the advertisement content and the obtained image in common, the advertisement content providing apparatus 100 may change an image of a building, included in the advertisement content, to an image of a building included in the obtained image.

This is merely an embodiment, and a method of changing at least some data, included in advertisement content, to at least some data of an obtained image is not limited thereto.

In operation S2070, the advertisement content providing apparatus 100 may provide the edited advertisement content to a display device. The display device may display the edited advertisement content.

Figure 21:
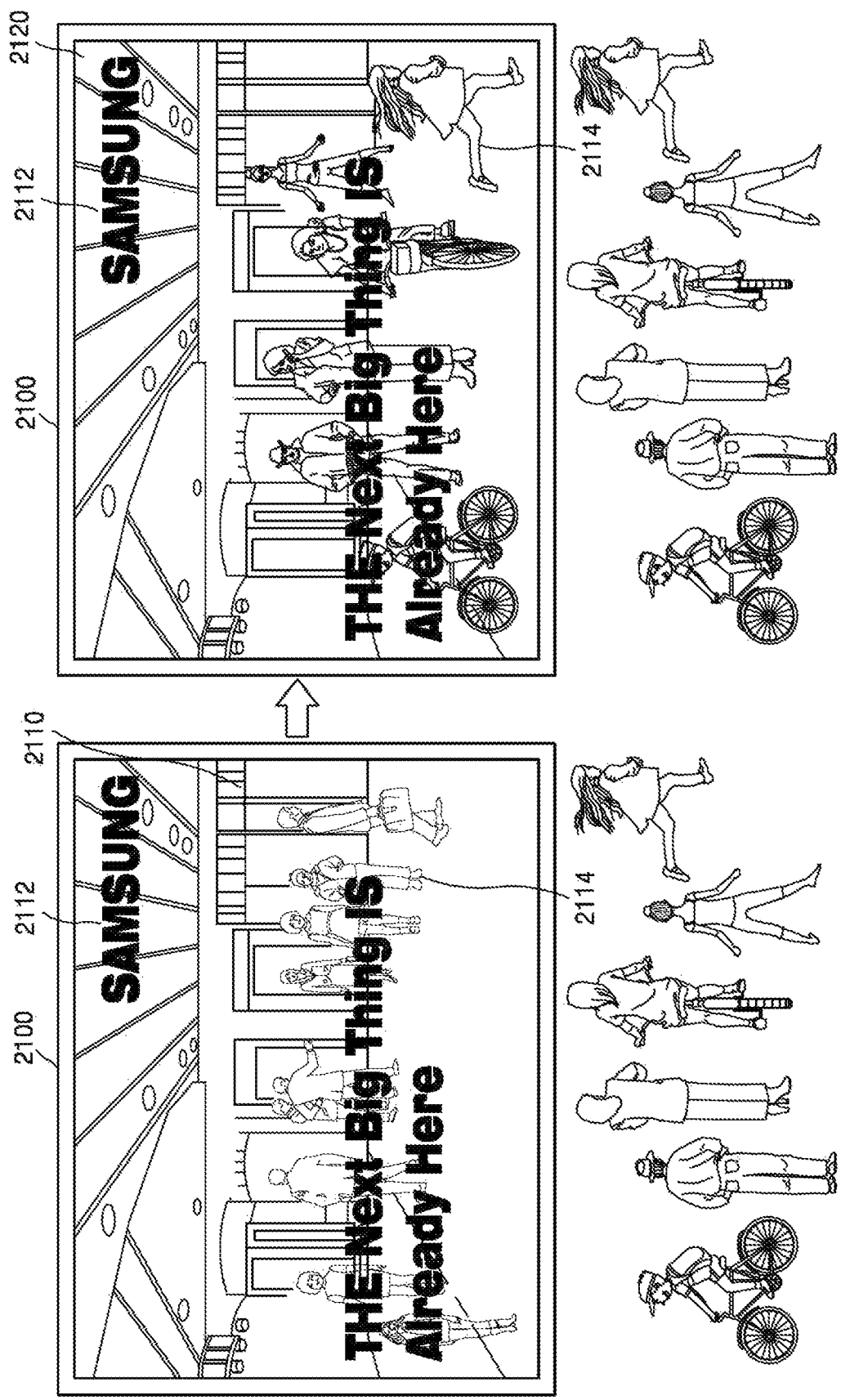
FIG. 21 is a diagram illustrating an example method of editing, by an advertisement content providing apparatus, advertisement content using a peripheral image of a position at which the advertisement content is displayed.

FIG. 21 is a diagram illustrating an example method of editing, by the advertisement content providing apparatus 100, advertisement content by using a peripheral image of a position at which the advertisement content is displayed.

The advertisement content providing apparatus 100 may provide advertisement content to a display device 2100. The display device 2100 may display the advertisement content. Referring to FIG. 21, the advertisement content may include an image 2110 showing persons which are lined up on a street, a brand name 2112, and a slogan 2114.

The advertisement content providing apparatus 100 may obtain a peripheral image of a position at which advertisement content is displayed. For example, the peripheral image of the position at which the advertisement content is displayed may be obtained from an image photographing device located within a certain range from a position at which a display device is located. For example, the advertisement content providing apparatus 100 may communicate with the image photographing device located near the display device to obtain a peripheral image of the display device while advertisement content is being displayed.

The advertisement content providing apparatus 100 may edit advertisement content using the obtained peripheral image. For example, the advertisement content providing apparatus 100 may change an image, included in the advertisement content, to an image included in the obtained peripheral image to edit the advertisement content.

Referring to FIG. 21, the advertisement content providing apparatus 100 may obtain an image 2120 showing persons near the display device 2100. The advertisement content providing apparatus 100 may change at least one 2110 of a plurality of images, included in the advertisement content, to the obtained image 2120 to edit the advertisement content.

Figure 22:
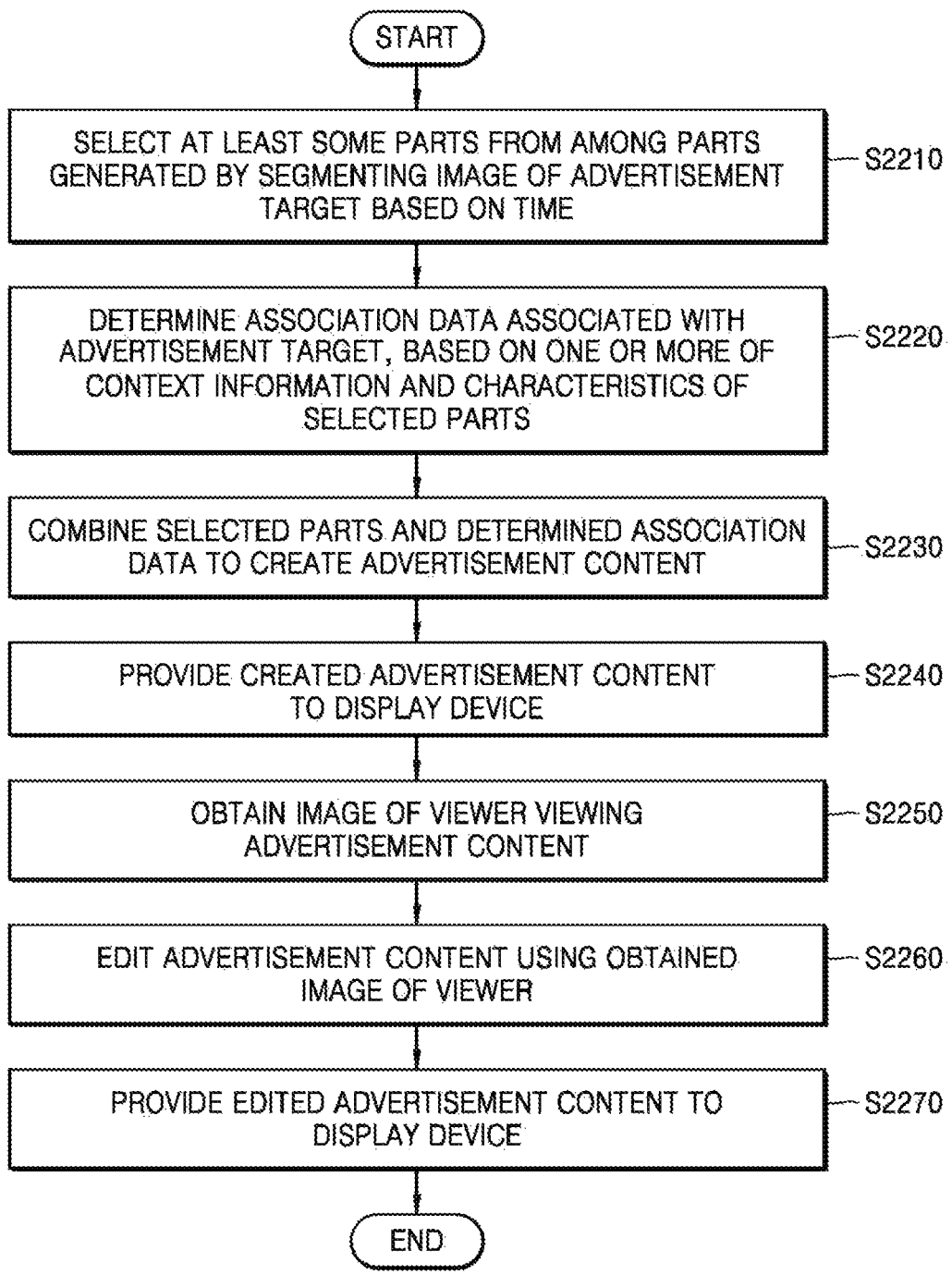
FIG. 22 is a flowchart illustrating an example method of editing, by an advertisement content providing apparatus, advertisement content using an image of a viewer viewing the advertisement content.

FIG. 22 is a flowchart illustrating an example method of editing, by the advertisement content providing apparatus 100, advertisement content by using an image of a viewer viewing the advertisement content.

In operation S2210, the advertisement content providing apparatus 100 may select at least some parts from among a plurality of parts which are generated by segmenting an image of an advertisement target based on time.

In operation S2220, the advertisement content providing apparatus 100 may determine association data associated with the advertisement target, based on one or more of context information and characteristics of the selected parts.

In operation S2230, the advertisement content providing apparatus 100 may combine the selected parts and the determined association data to create advertisement content.

In operation S2240, the advertisement content providing apparatus 100 may display the created advertisement content.

In operation S2250, the advertisement content providing apparatus 100 may obtain an image of a viewer viewing the advertisement content.

The advertisement content providing apparatus 100 may obtain a captured image of a viewer, which interests in advertisement content among one or more viewers viewing the advertisement content, from a display device displaying the advertisement content. For example, whether a viewer interests in the advertisement content may be determined based on whether the viewer makes a predetermined action such as whether the viewer has viewed the advertisement content for a certain time, whether the viewer touches a screen of a display device, and/or the like.

According to another example embodiment, the advertisement content providing apparatus 100 may obtain content stored in a device of a viewer. For example, when the viewer allows the content stored in the device to be shared with at least one of the advertisement content providing apparatus 100 and the display device, the advertisement content providing apparatus 100 may obtain the content stored in the device of the viewer. The advertisement content providing apparatus 100 or the display device may transmit a message, which requests sharing of the content, to the device of the viewer. When the viewer allows the content to be allowed, the device of the viewer may transmit the sharing-allowed content to advertisement content providing apparatus 100 or the display device.

In operation S2260, the advertisement content providing apparatus 100 may edit the advertisement content using the obtained image of the viewer.

When a captured image of a viewer is obtained, the advertisement content providing apparatus 100 may edit advertisement content in order for the image of the viewer to be added into the advertisement content. For example, the advertisement content providing apparatus 100 may change at least one of a plurality of images, included in the advertisement content, to the image of the viewer. However, this is merely an embodiment, and a method of editing advertisement content by using an image of a viewer is not limited thereto.

According to another example embodiment, the advertisement content providing apparatus 100 may edit advertisement content by using content stored in a device of a viewer. For example, the advertisement content providing apparatus 100 may change at least some data, included in the advertisement content, to at least some data included in the content stored in the device of the viewer to edit the advertisement content. However, this is merely an embodiment, and a method of editing advertisement content by using content stored in a device of a viewer is not limited thereto.

In operation S2270, the advertisement content providing apparatus 100 may provide the edited advertisement content to a display device. The display device may display the edited advertisement content.

Figure 23:
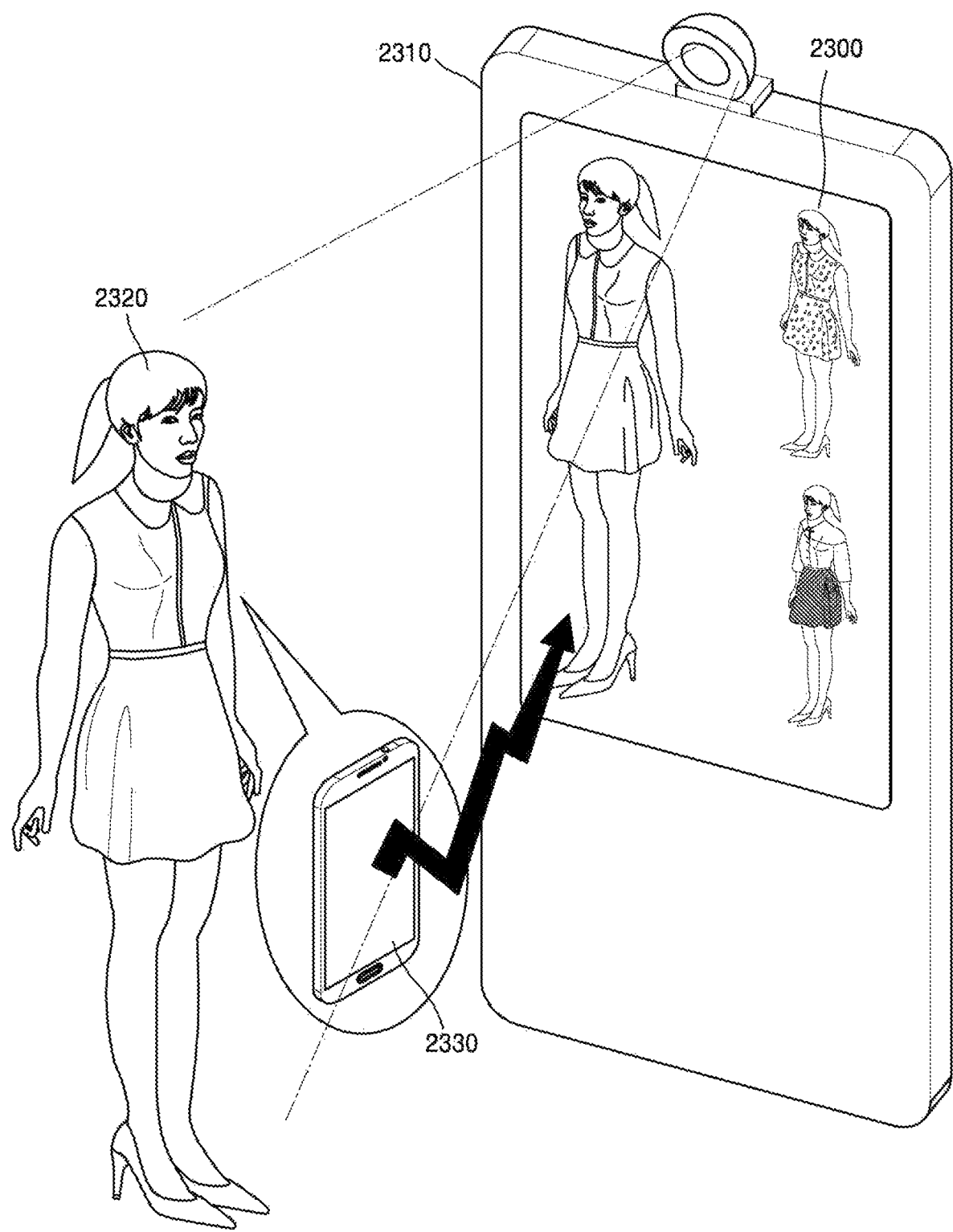
FIG. 23 is a diagram illustrating an example method of editing, by an advertisement content providing apparatus, advertisement content using an image of a viewer viewing the advertisement content.

FIG. 23 is a diagram illustrating an example method of editing, by the advertisement content providing apparatus 100, advertisement content by using an image of a viewer viewing the advertisement content.

Referring to FIG. 23, the advertisement content providing apparatus 100 may provide advertisement content 2310 to a display device 2300. The display device 2300 may display the advertisement content 2310.

The display device 2300 may photograph a viewer 2320, which makes a predetermined action, among one or more viewers. For example, the display device 2300 may photograph the viewer 2320 which has looked at the displayed advertisement content 2310 for a predetermined time or more. The display device 2300 may transmit an image of the photographed viewer 2320 to the advertisement content providing apparatus 100.

The advertisement content providing apparatus 100 may edit the advertisement content 2310 using the image of the viewer 2320. For example, the advertisement content providing apparatus 100 may change at least one of a plurality of images, included in the advertisement content 2310, to the image of the viewer 2320.

According to another example embodiment, the advertisement content providing apparatus 100 may obtain content from a device 2330 of the viewer 2320. When the viewer 2320 allows the content stored in the device 2330 to be shared, the advertisement content providing apparatus 100 may receive the content from the device 2330 of the viewer 2320.

The advertisement content providing apparatus 100 may change at least some data, included in the advertisement content 2310, to at least some data included in the received content to edit the advertisement content 2310.

Figure 24:
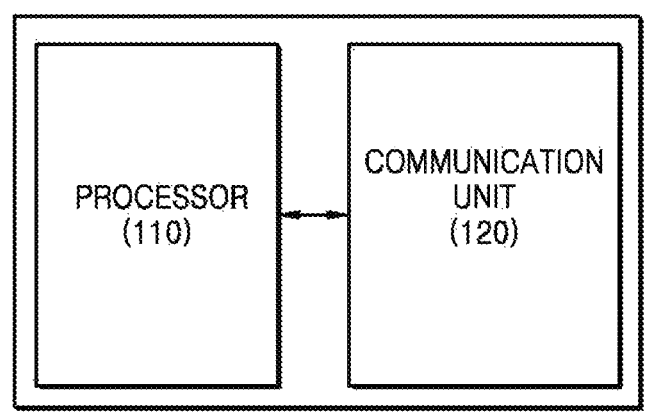

FIGS. 24 and 25 are block diagrams illustrating an example configuration of the advertisement content providing apparatus 100.

As illustrated in FIG. 24, the advertisement content providing apparatus 100 may include a processor 110 and a communication unit (e.g., including communication circuitry) 120. However, the illustrated elements are not all essential elements of the advertisement content providing apparatus 100. The advertisement content providing apparatus 100 may be implemented by elements more than the illustrated elements, or may be implemented by elements less than the illustrated elements.

For example, as illustrated in FIG. 25, the advertisement content providing apparatus 100 may further include an output unit (e.g., including output circuitry) 130, an input unit (e.g., including input circuitry) 140, a sensing unit (e.g., including at least one sensor) 150, an audio/video (A/V) input unit (e.g., including A/V input circuitry) 160, and a memory 170 in addition to the processor 110 and the communication unit 120.

Hereinafter, the elements will be described in order.

The processor 110 may be configured to control an overall operation of the advertisement content providing apparatus 100. For example, the processor 110 may execute programs stored in the memory 170 to overall control the communication unit 120, the output unit 130, the user input unit 140, the sensing unit 150, and the A/V input unit 160.

The processor 110 may be configured to select at least some parts from among a plurality of parts which are generated by segmenting an image of an advertisement target based on time. Also, the processor 110 may be configured to determine association data associated with the advertisement target, based on at least one of characteristics of the selected parts and context information indicating a condition where the advertisement content is displayed. The processor 110 may be configured to combine the selected parts and the determined association data to create the advertisement content.

The processor 110 may be configured to select at least some parts from among the plurality of parts, based on at least one of a degree of shaking of each of the plurality of parts and a similarity between the plurality of parts.

According to another example embodiment, the processor 110 may be configured to select at least some parts from among of a plurality of parts based on input data selected based on a received input. For example, the processor 110 may be configured to select a part, including an item indicated by the input data including one or more of image data, text data, and sound data, from among the plurality of parts.

According to another example embodiment, the processor 110 may be configured to select at least some parts from among a plurality of parts, based on context information indicating a condition where advertisement content is displayed. For example, the processor 110 may be configured to determine one or more of a reproducible duration of the advertisement content and an item preferred by a viewer of the advertisement content, based on the context information and may select at least some parts from among the plurality of parts, based on a result of the determination.

The processor 110 may be configured to sequentially select at least some parts from among a plurality of parts, based on two or more of characteristics of the plurality of parts, user input data, and context information.

The processor 110 may be configured to determine data including an item preferred by a viewer as association data, based on profile information about the viewer viewing advertisement content. Also, the processor 110 may determine, as the association data, one of at least one piece of content for which a frequency number of viewing is high.

According to another example embodiment, the processor 110 may be configured to determine, as association data, one or more of text data, image data, and sound data for indicating an item associated with an advertisement target. For example, the association data may be obtained from the memory 170 of the advertisement content providing apparatus 100, or may be obtained from an external device.

The processor 110 may be configured to determine a position of an advertisement target in a plurality of selected parts and may determine arrangement information in order for association data to be displayed within a predetermined range from the determined position. According to another example embodiment, the processor 110 may be configured to determine arrangement order information about an order where the selected parts and the association data are displayed. The processor 110 may be configured to combine the selected parts and the association data to create advertisement content, based on the determined arrangement information and arrangement order information.

The processor 110 may be configured to obtain a captured image of a viewer viewing advertisement content to edit the advertisement content. For example, the processor 110 may be configured to change at least one image, included in the advertisement content, to the captured image of the viewer to edit the advertisement content.

Moreover, the processor 110 may be configured to obtain content stored in a device of a viewer viewing advertisement content. The processor 110 may be configured to change at least some data, included in the advertisement content, to at least some data included in the obtained content.

The processor 110 may be configured to edit advertisement content, based on an image captured from a position at which the advertisement content is displayed. For example, the processor 110 may be configured to change at least one image, included in the advertisement content, to an obtained image to edit the advertisement content.

Moreover, while advertisement content is being displayed, the processor 110 may be configured to determine content for which a frequency number of viewing is high. The processor 110 may be configured to change at least some data, included in the advertisement content, to at least some data included in the determined content to edit the advertisement content.

The communication unit 120 may include communication circuitry configured to provide the created advertisement content to a display device.

The communication unit 120 may receive a captured image of an advertisement target from another device. Also, the communication unit 120 may receive a peripheral image from at least one of an image photographing device and a display device which are located at a position at which the advertisement target is displayed. The communication unit 120 may receive an image of a viewer photographed by at least one of the image photographing device and the display device which are located at the position at which the advertisement target is displayed.

Moreover, the communication unit 120 may receive content, stored in a device of a viewer, from the device of the viewer or a display device displaying advertisement content.

The communication unit 120 may receive information about high-interest content from an external device or a web server while advertisement content is being displayed.

Moreover, the communication unit 120 may include one or more elements, e.g. comprising communication circuitry, which enable communication between the advertisement content providing apparatus 100 and an external display device, an external image photographing device, or a device of a viewer. For example, the advertisement content providing apparatus 100 may include a short-range wireless communication unit 121, a mobile communication unit 122, and a broadcast receiver 123.

The short-range wireless communication unit 121 may include various communication circuitry including, for example, a Bluetooth communication unit, a Bluetooth low energy (BLE) communication unit, a near field communication unit, a WLAN (Wi-Fi) communication unit, a Zigbee communication unit, an infrared data association (IrDA) communication unit, a Wi-Fi direction (WFD) communication unit, an ultra-wideband (UWB) communication unit, or an Ant+ communication unit, but is not limited thereto.

The mobile communication unit 1520 includes communication circuitry that transmits or receives a wireless signal to or from at least one selected from a base station, an external terminal, and a server over a mobile communication network. Here, the wireless signal may include various types of data based on transmission or reception of a voice call signal, a video call signal, or a letter/multimedia message.

The broadcast receiver 123 includes communication circuitry that receives a broadcast signal and/or broadcast-related information from the outside through a broadcast channel. The broadcast channel may include a satellite channel and a terrestrial channel. The advertisement content providing apparatus 100 may not include the broadcast receiver 123 depending on an implementation example.

The output unit 130 may include circuitry that outputs an audio signal, a video signal, or a vibration signal. The output unit 130 may include a display 131, a sound output unit 132, and a vibration motor 133.

The display 131 may display information obtained through processing by the advertisement content providing apparatus 100. The display 131 may display an identification mark indicating an operation or an application associated with an operation of an application executed by the advertisement content providing apparatus 100. For example, the identification mark may include an icon and/or the like.

When the display 131 includes a touch screen in which the display 131 and a touch pad form a layer structure, the display 131 may be used as an input device in addition to an output device. The display 131 may include one or more selected from a liquid crystal display (LCD), a thin film transistor-LCD, an organic light-emitting diode display, a flexible display, a three-dimensional (3D) display, and an electrophoretic display, or the like. Also, the advertisement content providing apparatus 100 may include two or more the displays 131 depending on an implementation type of the advertisement content providing apparatus 100. In this example, the two or more displays 1210 may be disposed to face each other using a hinge.

The sound output unit 132 outputs audio data which is received from the communication unit 120 or stored in the memory 170. Also, the sound output unit 132 may output a sound signal associated with a function (for example, a call signal reception sound, a message reception sound, and an alarm sound) performed by the advertisement content providing apparatus 100. The sound output unit 132 may include a speaker and a buzzer.

The vibration motor 133 may output a vibration signal. For example, the vibration motor 133 may output a vibration signal corresponding to an output of audio/video data (e.g., a call signal alarm sound, a message alarm sound, etc.). Also, the vibration motor 133 may output a vibration signal when a touch screen is touched.

The input unit 140 denotes circuitry for inputting data which is used, for example, by a user to control the advertisement content providing apparatus 100. For example, the input unit 140 may include a keypad, a dome switch, a touch pad (for example, a contact capacitive type, a press resistive type, an infrared sensing type, a surface ultrasound conductive type, an integration tension measurement type, and a piezo effect type), a jog wheel, and a jog switch, but is not limited thereto.

The sensing unit 150 may sense a state of the advertisement content providing apparatus 100 or a peripheral state of the advertisement content providing apparatus 100, and transfer sensed information to the processor 110.

The sensing unit 150 may include, for example, one or more selected from a magnetic sensor 151, an acceleration sensor 152, a temperature/humidity sensor 153, an infrared sensor 154, a gyroscope sensor 155, a position sensor (for example, a global positioning system (GPS)) 156, a pressure sensor 157, a proximity sensor 158, and an RGB sensor (an illuminance sensor) 159, but is not limited thereto. A function of each of the sensors may be intuitively inferred from a name by one of ordinary skill in the art, and thus, its detailed description is not provided.

The A/V input unit 160 receives an audio signal or a video signal, and may include a camera 161 and a microphone 162. The camera 161 may obtain a picture frame, such as a still image or a moving image, through an image sensor in a video call mode or a photographing mode. An image captured through the image sensor may be processed by the processor 110 or a separate image processor (not shown).

A video frame obtained through processing by the camera 161 may be stored in the memory 170 or transmitted to the outside via the communication unit 120. For example, an image of an advertisement target may be captured by the camera 161. Two or more cameras 161 may be used according to the type of a terminal.

The microphone 162 receives an external sound signal and converts it into electric voice data. For example, the microphone 162 may receive a sound signal from an external device or a speaker. The microphone 162 may use various noise removing algorithms to remove noise generated when an external sound signal is received.

The memory 170 may store a program for processing and control by the processor 110 and may store pieces of input/output data (for example, a plurality of menus, a plurality of first layer sub-menus respectively corresponding to the plurality of menus, a plurality of second layer sub-menus respectively corresponding to the plurality of first layer sub-menus, etc.).

The memory 170 may include at least one type of storage medium selected from a flash memory type, a hard disk type, a multimedia card micro type, a card type memory (for example, an SD memory or an XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

A plurality of programs stored in the memory 170 may be classified into a plurality of modules depending on their functions, and for example, may be classified into a user interface (UI) module 171, a touch screen module 172, and an alarm module 173.

The UI module 171 may provide a specialized UI and graphic UI (GUI), which cooperate with the advertisement content providing apparatus 100, for each application. The touch screen module 172 may sense a touch gesture of a user which is applied to a touch screen, and transfer information about the touch gesture to the processor 110. The touch screen module 172 may recognize and analyze a touch code. The touch screen module 172 may be configured with separate hardware including a controller.

Various sensors may be provided inside or near a touch screen, for detecting a touch or a proximity touch of a touch screen. An example of a sensor for sensing a touch of the touch screen is a tactile sensor. The tactile sensor denotes a sensor that senses a touch by a specific object by a degree, in which a user feels, or more. The tactile sensor may sense various pieces of information such as a roughness of a touched surface, a stiffness of a touched object, a temperature of a touched point, etc.

Moreover, an example of a sensor for sensing a touch of the touch screen is a proximity sensor.

The proximity sensor denotes a sensor that detects an object approaching a detection surface or an object near the detection surface by using an electromagnetic force or infrared light without any mechanical contact. Examples of the proximity sensor include a transmissive photosensor, a directly reflective photosensor, a mirror reflective photosensor, a high frequency oscillation-type proximity sensor, a capacitive proximity sensor, a magnetic proximity sensor, and an infrared proximity sensor. Examples of a user's touch gesture described herein may include a tap, a touch and hold, a double tap, a drag, panning, a flick, a drag and drop, and a swipe.

The alarm module 173 may generate a signal for notifying an event which occurs in the advertisement content providing apparatus 100. Examples of the event which occurs in the advertisement content providing apparatus 100 may include reception of a call signal, reception of a message, an input of a key signal, and notification of a schedule. The alarm module 173 may output a notice signal in a video signal type through the display 131, output a notice signal in an audio signal type through the sound output unit 132, and output a notice signal in a vibration signal type through the vibration motor 133.

The method according to the various example embodiments may be implemented as computer-readable codes in a computer readable medium. The computer-readable recording medium may include a program instruction, a local data file, a local data structure, or a combination thereof. The computer-readable recording medium may be specific to example embodiments or commonly known to those of ordinary skill in computer software. The computer-readable recording medium includes all types of recordable media in which computer readable data are stored. Examples of the computer-readable recording medium include a magnetic medium, such as a hard disk, a floppy disk and a magnetic tape, an optical medium, such as a CD-ROM and a DVD, a magneto-optical medium, such as a floptical disk, and a hardware memory, such as a ROM, a RAM and a flash memory, specifically configured to store and execute program instructions. Furthermore, the computer readable recording medium may be implemented in the form of a transmission medium, such as light, wire or waveguide, to transmit signals which designate program instructions, local data structures and the like. Examples of the program instruction include machine code, which is generated by a compiler, and a high level language, which is executed by a computer using an interpreter and so on.

It should be understood that example embodiments described herein should be considered in a descriptive sense only and not for purposes of limitation. Descriptions of features or aspects within each embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope as defined by the following claims.

What is claimed is:

1. A computer implemented method of generating content associated with an object for advertising the object, the method comprising:
controlling a communication unit comprising communication circuitry to receive a video of the object from a camera used to capture the video,
generating a plurality of parts of the video of the object by segmenting the video based on time,
calculating at least one of (i) a degree of shaking for each of the plurality of parts based on measured movement of the camera during capture of the corresponding part of the plurality of parts or based on processing images in the corresponding part of the plurality of parts to determine trajectories of feature points in the image, or (ii) similarity with a previous part for each of the plurality of parts based on processing images in the corresponding part of the plurality of parts to determine similarity between items in the corresponding part and the previous part;
selecting some of the parts where the degree of shaking is less than a first predetermined value or the similarity is less than a second predetermined value, from among the plurality of parts;
determining association data associated with the object, based on one or more of (i) characteristics of the selected parts, (ii) context information indicating a condition where the selected parts is displayed, and (iii) a degree of interest determined based on a number of times of content view or a real-time searching word provided from a web server;
combining the selected parts and the association data to generate the content; and
controlling a display to display the generated content.

2. The method of claim 1, wherein the context information comprises one or more of a time when the content is displayed, a position at which the content is displayed, and profile information about a viewer viewing the content.

3. The method of claim 2, further comprising:
determining one or more of a reproducible duration of the content and an item preferred by the viewer viewing the content, based on the context information,
wherein the selecting comprises selecting at least some parts from among the plurality of parts, based on a result of the determination.

4. The method of claim 2, wherein the determining of the association data comprises determining, as association data, data including an item preferred by the viewer, based on the profile information about the viewer viewing the content.

5. The method of claim 1, further comprising:
obtaining an image of a viewer viewing the content; and
editing the content by changing at least one image, included in the content, to the obtained image of the viewer.

6. The method of claim 1, further comprising:
receiving content, stored in a device of a viewer viewing the content, from the device of the viewer; and
editing the created content by changing at least some data, included in the created content, to at least some data of the received content.

7. The method of claim 1, further comprising:
obtaining an image captured from a position at which the content is displayed; and
editing the content by changing at least one image, included in the content, to the obtained image.

8. The method of claim 1, further comprising:
while the content is being displayed, determining content for which a viewing frequency is greater than a predetermined threshold; and
editing the content by changing at least some data, included in the content, to at least some data included in the determined content.

9. A non-transitory computer-readable storage medium storing a program which, when executed by a computer, causes an apparatus for generating content associated with an object for advertising the object to perform the operations recited in claim 1.

10. An apparatus for generating content associated with an object for advertising the object, the apparatus comprising:
a communication unit comprising communication circuitry configured to transmit and receive data; and
a processor configured to:
control the communication unit to receive a video of the object from a camera used to capture the video;
generate a plurality of parts of the video of the object by segmenting the video based on time;
calculate at least one of (i) a degree of shaking for each of the plurality of parts based on measured movement of the camera during capture of the corresponding part of the plurality of parts or based on processing images in the corresponding part of the plurality of parts to determine trajectories of feature points in the image, or (ii) similarity with a previous part for each of the plurality of parts based processing images in the corresponding part of the plurality of parts to determine similarity between items in the corresponding part and the previous part;
select some of the parts where the degree of shaking is less than a first predetermined value or the similarity is less than a second predetermined value, from among the plurality of parts;
determine association data associated with the object, based on one or more of: (i) characteristics of the selected parts, (ii) context information indicating a condition where the selected parts is displayed, and (iii) a degree of interest determined based on a number of times of content view or a real-time searching word provided from a web server; and
combine the selected parts and the association data to generate the content; and
controlling the communication unit to transmit the generated content to a display device.

11. The apparatus of claim 10, wherein the processor is configured to determine one or more of a reproducible duration of the content and an item preferred by a viewer viewing the content, based on the context information and to select at least some parts from among the plurality of parts, based on a result of the determination.

12. The apparatus of claim 10, wherein the processor is configured to determine, as association data, data including an item preferred by a viewer, based on profile information about the viewer viewing the content.

13. The apparatus of claim 10, wherein
the communication unit is configured to obtain an image of a viewer viewing the content, and
the processor is configured to edit the content by changing at least one image, included in the content, to the obtained image of the viewer.

14. The apparatus of claim 10, wherein
the communication unit is configured to receive content, stored in a device of a viewer viewing the content, from the device of the viewer, and
the processor is configured to edit the created content by changing at least some data, included in the created content, to at least some data of the received content.

15. The apparatus of claim 10, wherein
the communication unit is configured to obtain an image captured from a position at which the content is displayed, and
the processor is configured to edit the content by changing at least one image, included in the content, to the obtained image.

16. The apparatus of claim 10, wherein while the content is being displayed, the processor is configured to determine content for which a viewing frequency is greater than a predetermined threshold, and to edit the content by changing at least some data, included in the content, to at least some data included in the determined content.

* * * * *